United States Patent
Hossain et al.

(10) Patent No.: US 12,543,148 B2
(45) Date of Patent: Feb. 3, 2026

(54) METHODS FOR UE ENERGY CONSUMPTION REDUCTION IN RRC_INACTIVE STATE

(71) Applicant: Telefonaktiebolaget LM Ericsson (publ), Stockholm (SE)

(72) Inventors: Istiak Hossain, Kista (SE); Andreas Höglund, Solna (SE); Tuomas Tirronen, Helsinki (FI); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 394 days.

(21) Appl. No.: 18/032,916

(22) PCT Filed: Oct. 8, 2021

(86) PCT No.: PCT/SE2021/050988
§ 371 (c)(1),
(2) Date: Apr. 20, 2023

(87) PCT Pub. No.: WO2022/086390
PCT Pub. Date: Apr. 28, 2022

(65) Prior Publication Data
US 2023/0397158 A1    Dec. 7, 2023

Related U.S. Application Data

(60) Provisional application No. 63/104,089, filed on Oct. 22, 2020.

(51) Int. Cl.
*H04W 76/04* (2009.01)
*H04W 68/00* (2009.01)

(52) U.S. Cl.
CPC .................. *H04W 68/005* (2013.01)

(58) Field of Classification Search
None
See application file for complete search history.

(56) References Cited

U.S. PATENT DOCUMENTS

2017/0181218 A1*  6/2017  Liu ................. H04W 76/27
2019/0320412 A1  10/2019  Drevöet al.
(Continued)

FOREIGN PATENT DOCUMENTS

WO  2014181981 A1  11/2014
WO  2020167205 A1   8/2020

OTHER PUBLICATIONS

3GPP, "3rd Generation Partnership Project; Technical Specification Group Services and System Aspects; Study on Cellular Internet of Things (CIoT) support and evolution for the 5G System (5GS) (Release 16)", 3GPP TR 23.724 V16.1.0, Jun. 2019, 274.
(Continued)

*Primary Examiner* — Gary Lafontant
(74) *Attorney, Agent, or Firm* — Murphy, Bilak & Homiller, PLLC

(57) ABSTRACT

Methods and apparatuses for receiving, and controlling the reception of, transmissions at a wireless device. A method performed by a base station comprises deriving a paging cycle for the wireless device, wherein the paging cycle controls the listening of the wireless device to a downlink channel for transmission from the base station or a core network. The method further comprises initiating transmission of an indication relating to the paging cycle to the wireless device.

19 Claims, 22 Drawing Sheets

(56) References Cited

U.S. PATENT DOCUMENTS

2020/0351821 A1* 11/2020 Wang .................. H04W 68/005
2023/0337148 A1* 10/2023 Liu ..................... H04W 52/325

OTHER PUBLICATIONS

QUALCOMM Incorporated, "PTW for eDRX in RRC-Inactive", 3GPP TSG-SA WG2 Meeting #130, S2-1900175, Kochi, India, Jan. 21-25, 2019, 1-5.

3GPP, "3GPP TS 36.331 V16.2.0", 3rd Generation Partnership Project; Technical Specification Group Radio Access Network; Evolved Universal Terrestrial Radio Access (E-UTRA); Radio Resource Control (RRC); Protocol specification (Release 16), Jul. 2020, 1-1081.

3GPP, "3GPP TS 38.331 V16.2.0", 3rd Generation Partnership Project; Technical Specification Group Radio Access Network; NR; Radio Resource Control (RRC) protocol specification (Release 16), Sep. 2020, 1-921.

3GPP, "3GPP TS 36.304 V16.2.0", 3rd Generation Partnership Project; Technical Specification Group Radio Access Network; Evolved Universal Terrestrial Radio Access (E-UTRA); User Equipment (UE) procedures in idle mode (Release 16), Sep. 2020, 1-64.

3GPP, "3GPP TS 38.213 V16.3.0", 3rd Generation Partnership Project; Technical Specification Group Radio Access Network; NR; Physical layer procedures for control (Release 16), Sep. 2020, 1-179.

3GPP, "3GPP TS 38.300 V16.3.0", 3rd Generation Partnership Project; Technical Specification Group Radio Access Network; NR; NR and NG-RAN Overall Description; Stage 2 (Release 16), Sep. 2020, 1-148.

3GPP, "3GPP TS 38.304 V16.2.0", 3rd Generation Partnership Project; Technical Specification Group Radio Access Network; NR; User Equipment (UE) procedures in Idle mode and RRC Inactive state (Release 16), Sep. 2020, 1-39.

3GPP, "3GPP TS 38.413 V16.3.0", 3rd Generation Partnership Project; Technical Specification Group Radio Access Network; NG-RAN; NG Application Protocol (NGAP) (Release 16), Sep. 2020, 1-411.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, 1-906.

3GPP, "3rd Generation Partnership Project; Technical Specification Group Services and System Aspects; System architecture for the 5G System (5GS); Stage 2 (Release 16)", 3GPP TS 23.501 V16.6.0, Sep. 2020, 1-447.

Bergman, John, "Status Report to TSG", 3GPP TSG RAN meeting #89e, RP-201676, Electronic Meeting, Sep. 14-18, 2020, 1-12.

Ericsson, "DRX in RRC_IDLE and RRC_INACTIVE state", 3GPP TSG-RAN WG2—AH, Tdoc R2-1700537, Spokane, Washington, U.S., Jan. 17-19, 2017, 1-4.

Ericsson, "Extended DRX for RRC_IDLE and RRC_INACTIVE for NR RedCap UE", 3GPP TSG-RAN WG2 #113e, R2-2100986, Electronic meeting, Jan. 25-Feb. 5, 2021, 1-8.

Unknown, Author, "Indication of CN Initiated or RAN Initiated Paging", 3GPP TSG-RAN WG2 #101, Tdoc R2-1802341, Ericsson, Athens, Greece, Feb. 26-Mar. 2, 2018, 4 pages.

Ericsson, "Revised SID on Study on support of reduced capability NR devices", 3GPP TSG RAN Meeting #89e, RP-201677, (revision of RP-191386), Electronic Meeting, Sep. 14-18, 2020, 1-4.

* cited by examiner

METHODS FOR UE ENERGY CONSUMPTION REDUCTION IN RRC_INACTIVE STATE

TECHNICAL FIELD

Embodiments of the present disclosure relate to methods, wireless devices and base stations, and particularly methods, wireless devices and base stations for receiving, and controlling the reception of, transmissions at a wireless device.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Internet of Things (IoT), Automation, and Robotics bring the so-called fourth revolution in the Industry domain, commonly known as Industry 4.0. Factories are automated and provide much more dynamic services with the help of connectivity. This involves real-time control of robots and machines using time-critical machine-type communication (cMTC) and improved observability, control, and error detection with large numbers of simpler actuators and sensors (often using massive machine-type communication, mMTC). Wireless connectivity contributes to the revolution by bringing flexibility and dynamicity.

In 3GPP Release 15, New Radio (NR) was implemented and focused primarily on enhanced mobile broadband (eMBB) and cMTC. Ultra-Reliable Low Latency Communication, URLLC, was implemented in Release 15 for both Long Term Evolution, LTE, and New Radio, NR, to facilitate the cMTC facilities. NR URLLC is further improved in Release 16 within the work items of enhanced URLLC (eURLLC) and Industrial IoT.

In Release 13, 3GPP released both narrowband-IoT (NB-IoT) and long-term evolution for machine-type networking (LTE-MTC, or LTE-M) for mMTC and low power large area (LPWA) service. Through all releases up to Release 16 work, these technologies have been further enhanced.

However, for Release 17, an NR UE type with reduced capabilities is introduced. The aim is to incorporate MTC in NR, i.e., the reduced UE power consumption of the mid-end NR unit (NR-REDCAP) fills the void between the eMBB NR and NB-IoT/LTE-M. NR RedCap devices are expected to transmit data in an aperiodic manner. Also, in many use cases, the payload size is comparatively small, for example below 100 bytes per transmission. Hence, from a power-saving perspective, an NR-RedCap UE may benefit more from the RRC_INACTIVE state than the RRC_IDLE state. As the UE context is stored during the RRC_INACTIVE state, the UE requires less signaling to transmit the data.

Discontinuous Reception (DRX) is supported in NR to reduce the time the receiver needs to listen for the Physical downlink control channel (PDCCH) and thus increase the time a UE is sleeping while in RRC_IDLE and RRC_INACTIVE state. For LTE, Extended DRX (eDRX) was introduced in Rel-13 LTE. It is a feature where the paging cycle is extended beyond 2.56 s. Moreover, if a UE is configured with 10.24 s or longer DRX cycle, eDRX operation with a paging time window (PTW) is applied. Also, for cycles longer than 10.24 s DRX cycle, a hyper System Frame Number (H-SFN) is defined in the LTE RAN specifications, so that it is possible to re-synchronize or keep synchronization over the Uu interface without the need for UL signaling. In Rel-15/16 of TR 23.501 (available at https://portal.3gpp.org/#/ as of 22 Oct. 2020) up to 10.24 s DRX cycle for CM_CONNECTED with RRC_IDLE and CM_IDLE with RRC_IDLE states, is supported for cellular IoT use cases, see TR 23.501. However, the eDRX feature is not supported in NR.

Support for eDRX in RRC_IDLE and RRC_INACTIVE' is considered for NR-RedCap in 3GPP Release-17. The study item RP-201677 (available at https://23w.3gpp.org/ftp/tsg_ran/TSG_RAN/TSGR_89e/Docs as of 22 Oct. 2020) on Reduced Capability NR Devices includes the following objective:

Study UE power saving and battery lifetime enhancement for reduced capability UEs in applicable use cases (e.g. delay tolerant) [RAN2, RAN1]:

Extended DRX for RRC Inactive and/or Idle [RAN2]

In 3GPP RAN2 #111e, RP-201676, following agreements related to UE power saving study are made:

RAN2 study eDRX mechanism for both RRC_IDLE and RRC_INACTIVE in this SI.

For RRC_INACTIVE, the DRX cycle is extended to 10.24 s as baseline.

For RRC_IDLE, the DRX cycle is at least extended to 10.24 s, with further extension beyond 10.24 s possible.

For RRC_IDLE and/or RRC_INACTIVE, if the NR DRX cycle range is extended beyond 10.24 s, the LTE eDRX mechanism beyond 10.24 s (e.g., PTW, PH, etc.) is used as baseline when NR eDRX cycle is configured beyond 10.24 s.

As a result of the above situation, 3GPP specified solutions for LTE in earlier specifications, like paging hyper-frame (PH), and wake-up signal (WUS), should be considered as a baseline to support eDRX in NR Redcap.

Current Status in NR

Typically, for robustness, a UE in RRC_INACTIVE state is reachable via both RAN-initiated paging and CN-initiated paging. That is, in INACTIVE the UE should be reachable via RAN paging but in case of state mismatch (i.e. the network may think the UE is in IDLE) the UE must still monitor CN paging as a safety precaution. The UE is addressed with a RAN allocated UE identity (I-RNTI) at RAN-initiated paging and a NAS identity (5G-S-TMSI) at CN-initiated paging. The use of different UE identities, in current specifications, in the pagingRecordList enables the UE to behave differently, for example: if the UE is addressed with I-RNTI, the UE shall attempt to resume its RRC connection; and if the UE, while in RRC_INACTIVE state, is addressed with 5G-S-TMSI, the UE shall enter RRC_IDLE state and inform NAS (to initiate an establishment of a new RRC Connection).

As illustrated in FIG. 1, in a legacy system, a UE in RRC_INACTIVE state may be configured with a DRX cycle for RAN initiated paging which is shorter than the DRX cycle for CN initiated paging. Consequently, the UE has to listen for both types paging, which may result in a fairly long time a UE needs to be awake compared to in RRC_IDLE where there is only CN paging. Furthermore, if eDRX is introduced to RAN paging, and RAN follows a different paging window than CN then an NR UE may have to wake up twice as much since uncoordinated RAN and CN paging cycle may require devices to monitor double paging occasions due to unilateral window configuration. FIG. 2 depicts the uncoordinated RAN and CN paging cycle impact on device sleeping. In case of 40.96 s paging cycle a device is supposed to sleep for 3 radio frames. However, for uncoordinated RAN and CN cycles the UE may need to either wake up due to page and/or keep awake for longer period. This results in unnecessary wakeup and synchronization effort that degrades the battery lifetime gain of the UE.

The UE battery life is to a large extent determined by all procedures during which the UE cannot sleep to conserve power. A reference list of possible power consumption in different states can be found in Table 1.

TABLE 1

Reference UE power consumption per state

| UE State | Power consumption |
|---|---|
| Deep Sleep | 15 µW |
| Light Sleep | 3 mW |
| Transmission | 500 mW |
| State Transition | |
| Reception | 80 mW |

As is evident from the values in Table 1, if the UE needs to monitor paging 7 times longer than it is transmitting, or 7 times more often due to infrequent transmissions, this will consume more energy than the data transmission, as demonstrated by the following equation $P_{TX}$Time<$P_{RX}$7Time→500<(7×80)→500<560.

RAN paging is designed to monitor PDCCH for scheduling flexibility of any UL or DL transmissions. Hence, the battery usage contribution from RAN initiated paging, CN paging in RRC_INACTIVE, and state transitions of the device can be quite large even though there is no data transmission.

One motivation of frequent RAN paging is to reduce the DL data buffering at the CN and RAN. However, under some circumstances and use cases, the UE energy consumption reduction can be more important than latency and data buffering.

There currently exist certain challenge(s). The current RRC_INACTIVE state supports both Radio Access Network, RAN, and Core Network, CN, initiated paging where the RAN paging follows one periodic duty cycle and CN initiated paging follow a second duty cycle. These two duty cycles are controlled (to some extent) by different entities. In every paging occasion (PO) the UE needs to sync to the gNB as the Tracking Reference Signal (TRS) sync cycle max length is 320 ms. In NR, due to the beam sweeping, Synchronisation Signal Block, SSB, sync takes longer time than LTE synchronization. Also, unlike LTE, in NR the POs are mapped to each SSB in multiple time and frequency slots. This contributes to the UE energy consumption in the form of unnecessary Physical Downlink Control Channel, PDCCH, monitoring.

Further, there is no solution in NR for RRC_INACTIVE DRX with durations greater than 10.24 s. This may be a disadvantage, from a power consumption perspective, for NR devices. If the extended discontinuous reception, eDRX, cycle length is extended beyond 10.24 s in NR-RedCap, it is unclear how the paging should work in RRC_INACTIVE state.

TS 36.304, Evolved Universal Terrestrial Radio Access (E-UTRA); User Equipment (UE) procedures in idle mode, Release-16, V16.2.0, available at https://portal.3gpp.org/desktopmodules/Specifications/SpecificationDetails.aspx?specificationId=2432 as of 23 Aug. 2021 specifies the properties of the Access Stratum (AS) part of the idle mode procedures applicable to a UE.

TS 38.304, NR; User Equipment (UE) procedures in idle mode and in RRC Inactive state, V 16.2.0, available at https://portal.3gpp.org/desktopmodules/Specifications/SpecificationDetails.aspx?specificationId=3192 as of 23 Aug. 2021 also specifies the properties of the Access Stratum (AS) part of the idle mode procedures applicable to a UE, and also procedures in RRC_INACTIVE state.

TS 23.501, System architecture for the 5G System (5GS), Release 16, V16.6.0, available at https://portal.3gpp.org/desktopmodules/Specifications/SpecificationDetails.aspx?specificationId=3144 as of 23 Aug. 2021 defines the Stage 2 system architecture for the 5G System, providing data connectivity and services.

TS 38.331, NR; Radio Resource Control (RRC); Protocol specification, Release 16, V16.1.0, available at https://portal.3gpp.org/desktopmodules/Specifications/SpecificationDetails.aspx?specificationId=3197 as of 23 Aug. 2021 specifies the Radio Resource Control protocol for the radio interface between UE and NG-RAN.

TS 36.331, Evolved Universal Terrestrial Radio Access (E-UTRA); Radio Resource Control (RRC); Protocol specification, V16.2.0, available at https://portal.3gpp.org/desktopmodules/Specifications/SpecificationDetails.aspx?specificationId=2440 as of 23 Aug. 2021 specifies the Radio Resource Control protocol for the radio interface between UE and E-UTRAN as well as for the radio interface between RN and E-UTRAN.

TS 38.300, NR; NR and NG-RAN Overall description; Stage-2 V16.3.0, available at https://portal.3gpp.org/desktopmodules/Specifications/SpecificationDetails.aspx?specificationId=3191 as of 23 Aug. 2021 provides an overview and overall description of the NG-RAN and focuses on the radio interface protocol architecture of NR connected to 5GC.

TS 38.213, NR; Physical layer procedures for control, V16.3.0 available at https://portal.3gpp.org/desktopmodules/Specifications/SpecificationDetails.aspx?specificationId=3215 as of 23 Aug. 2021 specifies and establishes the characteristics of the physical layer procedures for control operations in 5G-NR.

TS 38.413 NG-RAN; NG Application Protocol (NGAP), V16.3.0 available at https://portal.3gpp.org/desktopmodules/Specifications/SpecificationDetails.aspx?specificationId=3223 as of 23 Aug. 2021 specifies the radio network layer signalling protocol for the NG interface.

SUMMARY

It is an object of the present disclosure to provide methods and apparatus for configuring paging, particularly in RRC_INACTIVE states, to provide increased power efficiency.

Embodiments of the disclosure aim to provide methods and apparatus that alleviate some or all of the challenges identified herein.

An embodiment of the disclosure provides a method performed by a wireless device for receiving transmissions. The method comprises obtaining an indication, and determining a paging cycle for listening to a downlink channel for transmissions from a base station or core network based on the obtained indication.

A further embodiment of the disclosure provides a method performed by a base station for controlling the reception of transmissions at a wireless device. The method comprises deriving a paging cycle for the wireless device, wherein the paging cycle controls the listening of the wireless device to a downlink channel for transmission from the base station or a core network. The method further comprises initiating transmission of an indication relating to the paging cycle to the wireless device.

A further embodiment of the disclosure provides a wireless device for receiving transmissions. The wireless device comprises processing circuitry configured to cause the wireless device to: obtain an indication; and determine a paging cycle for listening to a downlink channel for transmission from a base station or core network, CN, based on the obtained information. The wireless device further comprises power supply circuitry configured to supply power to the wireless device.

A further embodiment of the disclosure provides a base station for controlling the reception of transmissions at a wireless device. The base station comprises processing circuitry configured to cause the base station to derive a paging cycle for the wireless device, wherein the paging cycle controls the listening of the wireless device to a downlink channel for transmission from the base station or a core network. The processing circuitry further causes the base station to initiate transmission of an indication relating to the paging cycle to the wireless device. The base station further comprises power supply circuitry configured to supply power to the base station.

Further embodiments of the disclosure provide communication systems comprising one or both of the wireless device and base station, and/or configured to perform methods in accordance with embodiments.

BRIEF DESCRIPTION OF DRAWINGS

For better understanding of the present disclosure, and to show how it may be put into effect, reference will now be made, by way of example only, to the accompanying drawings, in which.

Figure 1:
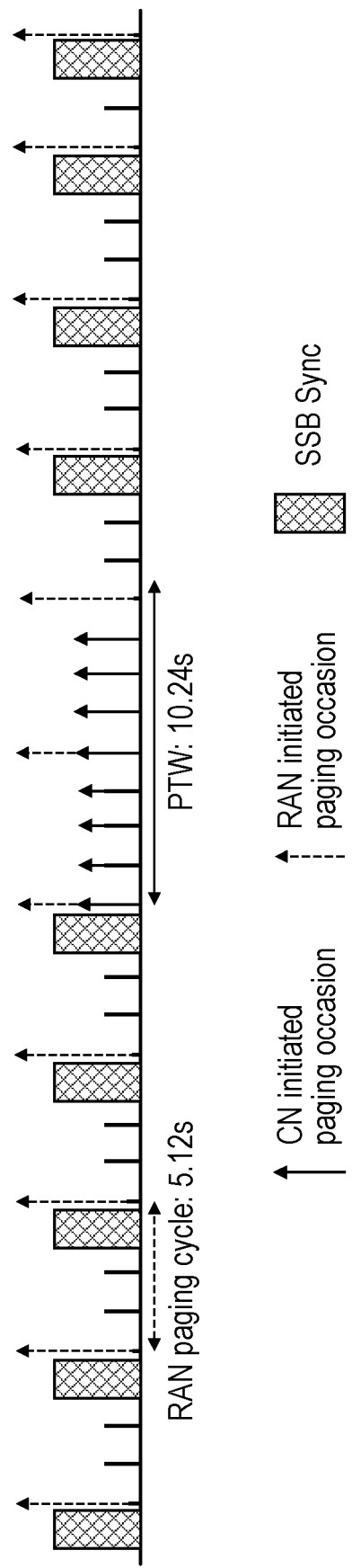
FIG. 1 is a diagram showing Paging in RRC_INACTIVE state.
Figure 2:
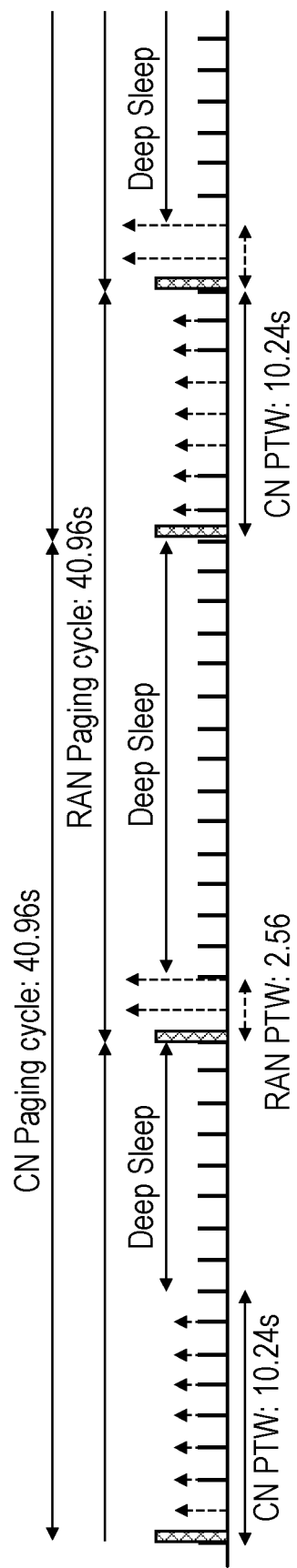
FIG. 2 is a diagram showing a unilateral Paging cycle for RAN and CN.

Certain aspects of the present disclosure and their embodiments may provide solutions to these or other challenges. Aspects of embodiments introduce a common paging cycle used both for RAN paging and CN paging. Also, mechanisms to indicate the RAN and CN Coordination during eDRX in RRC_INACTIVE state are provided. Also provided are methods to further reduce the RRC_INACTIVE paging and on-time with a solution for how to increase the DRX cycle length.

The RAN paging and device active time in RRC_INACTIVE may be configurable depending on the network entities and may be signaled via MAC or upper layers or implicitly decided upon through other configurations, e.g., the configurations of initial synchronization in NR and latency requirement for different services. Mechanisms for such configurations are discussed below which may reduce the RRC_INACTIVE paging and on-time where applied. With a more efficient paging in place, there is reason to extend the DRX cycle beyond 10.24 s and reduce power consumption even further.

Aspects of embodiments introduce an indication of when CN and RAN can use the same paging cycle and when the CN and RAN paging can choose uncoordinated windows.

Aspects of embodiments also provide methods to further reduce the RRC_INACTIVE paging and on-time.

There are, proposed herein, various embodiments which address one or more of the issues disclosed herein. Aspects of embodiments provide methods performed by wireless devices for receiving transmissions, the methods comprising: obtaining an indication; and determining a paging cycle for listening to a downlink channel for transmission from a base station or core network, CN, based on the obtained indication.

Further aspects of embodiments provide methods performed by base stations for controlling the reception of common transmissions at a wireless device, the methods comprising: deriving a paging cycle for the wireless device, wherein the paging cycle controls the listening of the wireless device to a downlink channel for transmission from the base station or a core network, CN; and initiating transmission of an indication relating to the paging cycle to the wireless device.

Certain embodiments may provide technical advantage(s), including reduced UE energy consumption from enabling longer eDRX cycles and coordinating the monitoring of CN paging and RAN paging in RRC INACTIVE state.

ADDITIONAL EXPLANATION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.
Indication of RAN Extended Paging Policy In 3GPP Rel-16 TS 38.300 (available at https://portal.3gpp.org/desktopmodules/Specifications/SpecificationDetails.aspx?specificationId=3191 as of 22 Oct. 2020), the RAN initiated paging policy is configured by indicating ran-PagingCycle in RRCResume to eMTC UE. In this case, the eMTC UE, as part of legacy procedure, applies the shortest of the ran-PagingCycle (if configured), the (UE specific) paging cycle (if indicated by upper layers), and the defaultPagingCycle included in the radioResourceConfigCommon.

According to aspects of embodiments, instead of having separate RAN and CN paging occasions, RAN and CN can coordinate the paging cycle to in case of eDRX for CN-initiated paging. The ng-RAN or gNB indicates support for eDRX in system information like SIB1 and the UE is configured by upper layers. Periodic paging cycle and paging monitoring window length i.e. PTW may be configured by an Access and Mobility Management Function, AMF, of a CN if PTW is applied. To indicate the RAN or ng-RAN or gNB, AMF can include the extended DRX cycle length and the PTW length in the NG control plane interface (NG-C) or NGAP or NG-Connection or connection establishment indication or RAN assistance information message to assist the NG-RAN nodes in determining the paging cycle and monitoring window. In order to indicate an extended RAN Paging time Window (R-PTW), various methods can be used, including one or more of the methods discussed below.
Upper Layer Assisted In some aspects of embodiments, the AMF can configure a paging cycle and monitoring window length. The AMF may use the formula from Section 7 in TS 36.304 (available at https://portal.3gpp.org/desktopmodules/Specifications/SpecificationDetails.aspx?specificationId=2432 as of 22 Oct. 2020) to configure the paging monitoring window i.e. PTW.

The AMF may indicate the DRX cycle length and the PTW length in a paging message or RAN assistance information or in some other assistance information message to gNB in order to assist the gNB nodes in configuring the paging monitoring window and paging the UE. The RAN may use the Upper layer configured PTW for RAN and CN paging.

In some aspects of embodiments, the AMF can configure the RAN PTW (R-PTW) separately for RAN using common function model. In some aspects of embodiments, the function below can be used to calculate the PTW separately:

PTW_start, denotes the radio frame of the PH that is part of the PTW and has SFN satisfying the following equation:

$$SFN = 256 * i_{eDRX,R\text{-}PTW}, \text{ where}$$

$I_{eDRX,R\text{-}PTW} = \text{floor}(UE\_ID\_H/T_{eDRX,R\text{-}H}) \mod 4$ where $T_{eDRX,R\text{-}H} =$ RAN eDRX cycle of the UE in Hyperframes and configured by the upperlayers.

PTW_end is the last radio frame of the PTW and has SFN satisfying the following equation:

$$SFN = (PTW\_start + (L)*100 - 1) \mod 1024, \text{ where}$$

L=Paging Time Window length (in seconds)

The AMF may indicate the RAN-paging cycle length, CN paging cycle length and PTW length in Initial Context Setup Request or NG control plane interface (NG-C) or NG-Connection, or NGAP or connection establishment indication or RAN assistance information or paging message or other CN to RAN assistance message to assist the gNBs in configuring and paging the UE. The RAN may use the Upperlayer configured paging monitoring length for RAN and CN paging. In this case the paging can occur in the same window or separately.

Figure 3:
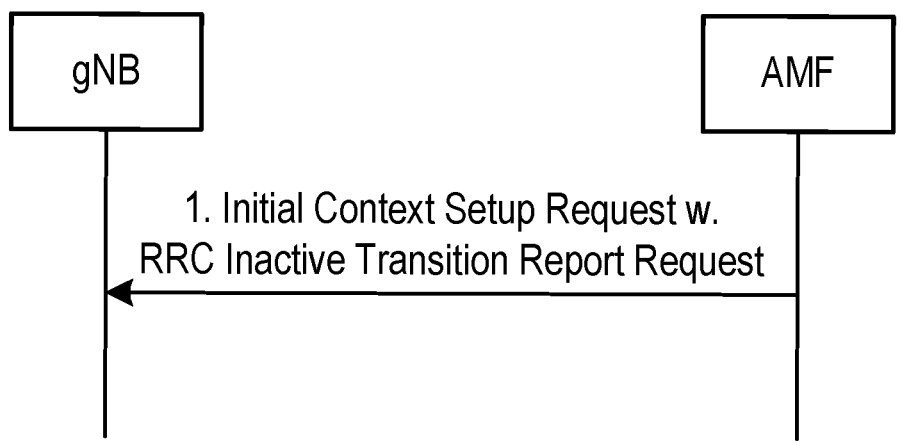
FIG. 3 is a diagram showing DRX coordination indication to RAN during the RRC_INACTIVE configuration.

In some aspects of embodiments, the signalling for RAN-CN coordination AMF may include the Paging DRX IE and paging monitoring length (or PTW length) information in RRC Inactive Transition Report Request of Initial Context Setup Request. An example message flow is shown in FIG. 3.

The RRC Inactive Transition Report Request may become a Sequence of AMF code where the section 9.3.1.91 of TS 38.413 may adopt the new IE format, for example as shown in table 2 below.

TABLE 2

RRC Inactive Transition Report Request

| IE/Group Name | Presence | Range | IE type and reference | Semantics description |
|---|---|---|---|---|
| RRC Inactive Transition Report Request | M | | ENUMERATED (Subsequent state transition report, Single RRC connected state report, Cancel report, . . .) | |
| Paging DRX | M | | ENUMERATED (32, 64, 128, 256, 512, 1024 . . .) | |
| PTW Length | | | ENUMERATED (32, 64, 128, 256, 512, 1024. 2048 . . .) | |

In some aspects of embodiments, in the paging monitoring configuration, the RAN and CN monitoring windows aka PTW may have different lengths. An example of this is illustrated by the equations below:

$$SFN_{R\text{-}PTW} = (PTW\_start + (L_{R\text{-}PTW}) * 100 - 1) \bmod 1024,$$
where $$SFN_{CN\text{-}PTW} = (PTW\_start + (L_{CN\text{-}PTW}) * 100 - 1) \bmod 1024,$$ where $L_{R\text{-}PTW}$ = RAN PTW length(in seconds)

$L_{CN\text{-}PTW}$ = CN PTW length(in seconds)

In this way RAN and CN may share the same paging cycle length but the PDCCH monitoring window size would be different. However, the PTW start frame would be the same.

Figure 4:
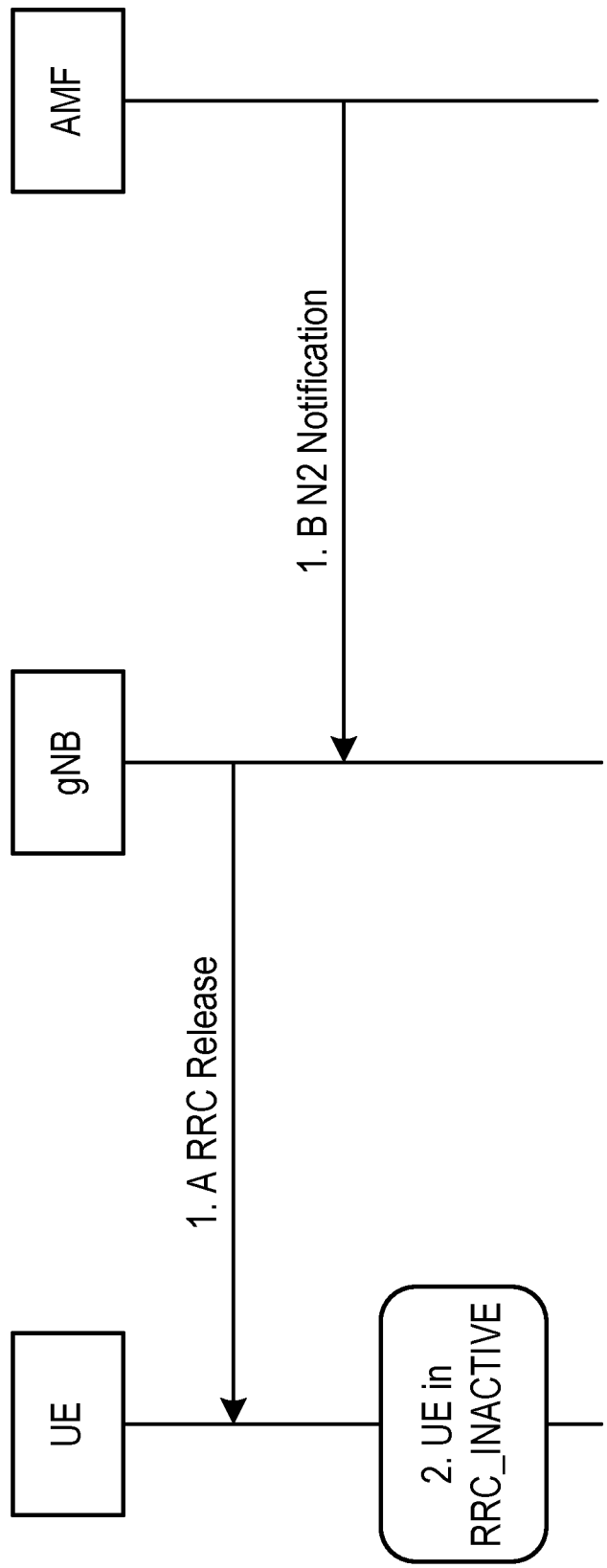
FIG. 4 is a diagram showing N2 Notification indicating of RAN-DRX cycle to AMF during the RRC_INACTIVE configuration.

The RAN-DRX cycle information may be provided by RAN to the CN using an N2 Notification. FIG. 4 illustrates an example of the message flow.

RAN to UE Indication

In some aspects of embodiments, based on AMF's provided "RRC INACTIVE Assistance information" RAN can indicate to the UE (in RRCRelease message) that RAN will use the same paging and paging monitoring cycle as configured by AMF. An example message is shown below:

```
SuspendConfig ::=              SEQUENCE {
   fullI-RNTI               I-RNTI-Value,
   shortI-RNTI              ShortI-RNTI-Value,
      ran-PHSupport               BIT STRING (SIZE (1))
      ran-PagingSupport           BIT STRING (SIZE (1))
   ran-PagingCycle             PagingCycle,
      OPTIONAL,    -- Need ?
   ran-NotificationAreaInfo            RAN-NotificationAreaInfoM
   t380            PeriodicRNAU-TimerValue   OPTIONAL, -- Need R
   nextHopChainingCount            NextHopChainingCount,
}
PagingCycle ::=            ENUMERATED {rf32, rf64, rf128, rf256, rf 512, rf
1024}
```

In some aspects of embodiment the RAN can decide to use the same paging hyperframe (PH) during the RRCRelease.

In the suggested example ASN.1 code (as shown herein) the RAN-PTW support represents 1-bit information to indicate whether the RAN follows the same PTW as that configured by AMF or if RAN follow its own PTW and separate paging. Based on this indication the UE either follows the paging cycle. For example, but not limited to, if RAN-paging support is set to 0 then the UE follows the CN paging otherwise it follows RAN configured paging. In some embodiments, the RAN eDRX cycle length is determined by a few bits relative to the configured eDRX cycle length. An example of this using two signalling bits is illustrated in Table 3.

TABLE 3

RAN eDRX cycle length bit mapping.

| Bit string: | Value: |
|---|---|
| 00 | CN eDRX cycle length |
| 01 | ½ × CN eDRX cycle length |
| 10 | ¼ × CN eDRX cycle length |
| 11 | ⅛ × CN eDRX cycle length |

The ran-PagingCycle information may be optional. In other words, if the RRCRelease message does not contain ran-PagingCycle information then the UE may follow the CN paging cycle for RAN paging.

The system information may carry 1-bit information in SIB or MIB to indicate the RAN and CN coordinated paging. As an example of this: 1 bit to indicate the RAN and CN can follow the same paging cycle and 1 bit in SIB to indicate that the UE should configure the same paging monitoring window length or configure RAN and CN paging windows individually.

UE Preconfigured

In some aspects of embodiments, the default UE configuration may specify to use the default paging cycle for both RAN and CN unless otherwise the network indicate to have the paging cycle separately. In this case, during the RRC and NAS configuration the UE may only look for the PTW lengths and may use the default paging cycle. The UERadiopagingInfo can be used to signal the UE RAN CN coordinated paging cycle configuration. For example, but not limited to, in UE-RadioPagingInfo, an information element UE-CoordinatedpagingSupport-r17 can be used to indicate the UE support for RAN and CN coordinated paging as a default UE configuration.

```
-- ASN1START
UE-RadioPagingInfo-r12 ::=                      SEQUENCE {
    ue-Category-v1250                           INTEGER (o)
    OPTIONAL,
    ...,
    [[      ue-CategoryDL-v1310                 ENUMERATED
{m1}    OPTIONAL,
            ce-ModeA-r13                        ENUMERATED {true}
    OPTIONAL,
            ce-ModeB-r13                        ENUMERATED {true}
    OPTIONAL
    ]],
    [[      wakeUpSignal-r15                    ENUMERATED {true}
    OPTIONAL,
            wakeUpSignal-TDD-r15                ENUMERATED {true}
    OPTIONAL,
            wakeUpSignalMinGap-eDRX-r15         ENUMERATED
{ms40, ms240, ms1000, ms2000}       OPTIONAL,
            wakeUpSignalMinGap-eDRX-TDD-r15     ENUMERATED
{ms40, ms240, ms1000, ms2000}       OPTIONAL
    ]],
    [[      ue-CategoryDL-v1610                 ENUMERATED
{m2}    OPTIONAL,
            groupWakeUpSignal-r16               ENUMERATED {true}
    OPTIONAL,
            groupWakeUpSignalTDD-r16            ENUMERATED {true}
    OPTIONAL,
            groupWakeUpSignalAlternation-r16    ENUMERATED {true}
    OPTIONAL
            groupWakeUpSignalAlternationTDD-r16 ENUMERATED {true}
    OPTIONAL
    ]]
    [[UE-CoordinatedpagingSupport-r17
    ENUMERATED {true}       OPTIONAL,
    ]]
}
-- ASN1STOP
```

Configuration Options

Based on the RAN and CN based indication, RAN may transmit paging using a shared PTW (S-PTW) and/or can have a separate DRX paging cycle with different PTW, and/or can configure separate PTWs using the same DRX cycle (which may be referred to as Joint PTW J-PTW).

Shared PTW

Figure 5:
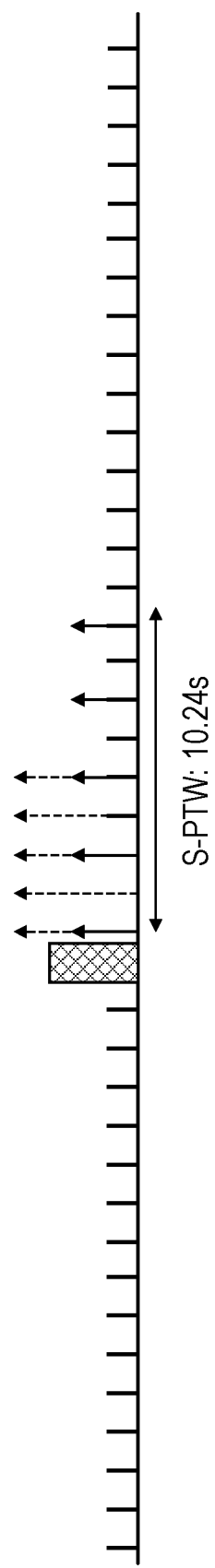
FIG. 5 is a diagram showing Shared-PTW when RAN and CN page sharing a time window.

When RAN and CN uses the same paging cycle based on any of the indications mentioned above, but not limited to, the RAN and CN shares the paging monitoring occasions called Shared-PTW (S-PTW). Within the S-PTW, RAN schedules both CN and RAN paging IDs in each POs randomly or based on a scheduling mechanism. In this case, the UE needs to monitor all the POs within the S-PTW until it receives I-RNTI or 5G-S-TIMSI paging ID. FIG. 5 illustrates the discussed configuration and RAN and CN paging options.

Figure 6:
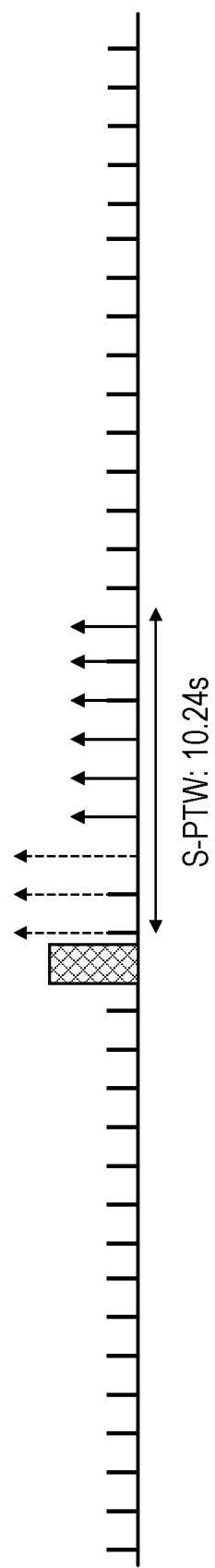
FIG. 6 is a diagram showing Shared-PTW when RAN-paging message transmits before the CN paging message.

When RAN and CN use the same paging cycle based on any of the indications mentioned above, but not limited to, RAN can decide to buffer the CN paging and send the I-RNTI first for the RAN-paging and then transmit 5G-S-TMSI or vice versa. In this way devices with the matched I-RNTI can stop PO monitoring early which can potentially reduce the power consumption. An example of this is illustrated in FIG. 6.

The RAN may be able to configure RAN eDRX with the knowledge of CN eDRX config, but it could still be twice as frequent or have a slightly different PTW length that is up to NW implementation.

Figure 7:
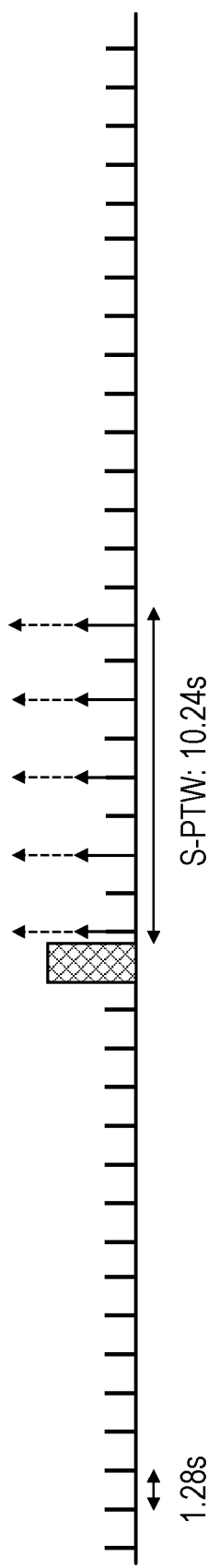
FIG. 7 is a diagram showing Shared-PTW when RAN and CN coordinated POs monitoring.

When RAN and CN uses the same paging cycle based on any of the indication mentioned above, but not limited to, RAN and CN use the same paging occasions within the paging monitoring window i.e. PTW. In this way devices may need to monitor less POs and may get better chance for micro sleep within the PDCCH monitoring period, as illustrated in FIG. 7.

Figure 8:
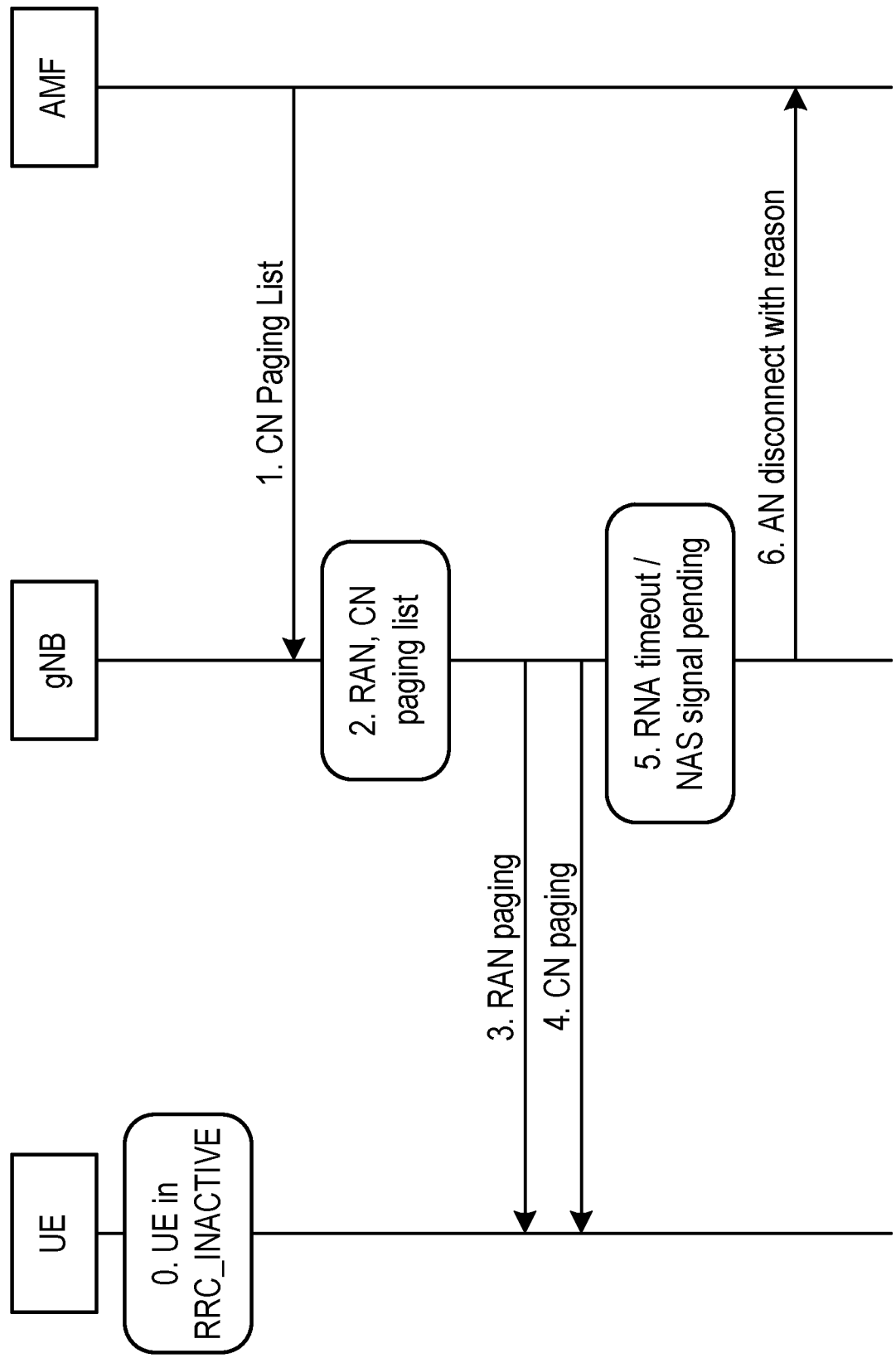
FIG. 8 is a diagram showing a Message flow of Shared-PTW when RAN-paging message transmits before the CN paging message.

An example message flow is shown in FIG. 8. Upon reception of a CN paging List from AMF, designated RAN list the paging cycle and map the RAN and CN paging ID. Then Transmit the RAN paging in first POs of the S-PTW. Then Transmit the CN paging. Upon A S1 signaling failure or state mismatch or RNA timeout RAN notifies AMF by triggering "AN disconnect with reason". Then in the next DRX cycle the device is informed of this due to receiving CM disconnect information.

Joint-PTW

Figure 9:
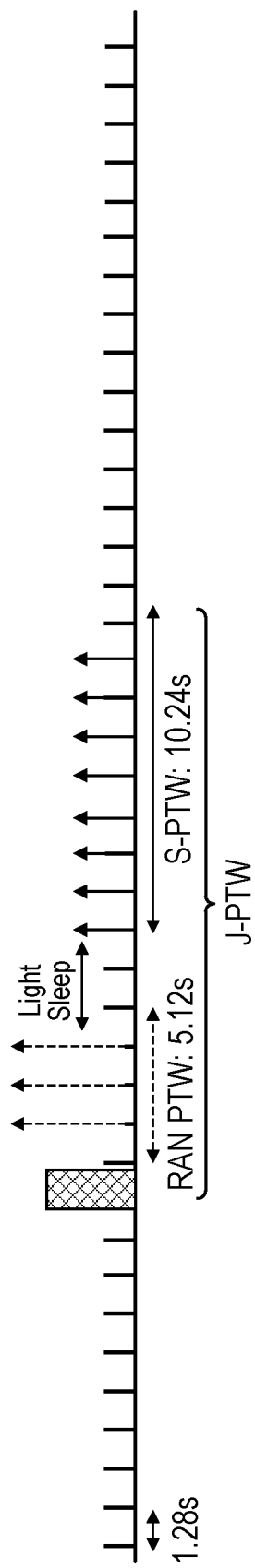
FIG. 9 is a diagram showing an Example of J-PTW.

The RAN may configure its own paging but also consider the CN-paging location and collocates the paging time to avoid multiple synchronization. Due to that the Joint-PTW may have a longer paging window than S-PTW. The UE can retransmit within the TRS cycle during DRX OFF duration. With the J-PTW, the device can be in light sleep mode as illustrated in FIG. 9. Also, RAN depends up the ration of CN and RAN paging request configure the light sleep and can flexibly extend or decrease the PTW. In other words, even if the J-PTW increase the time window when devices are on but can also flexibly control the sleep cycle within the J-PTW cycle.

Figure 10:
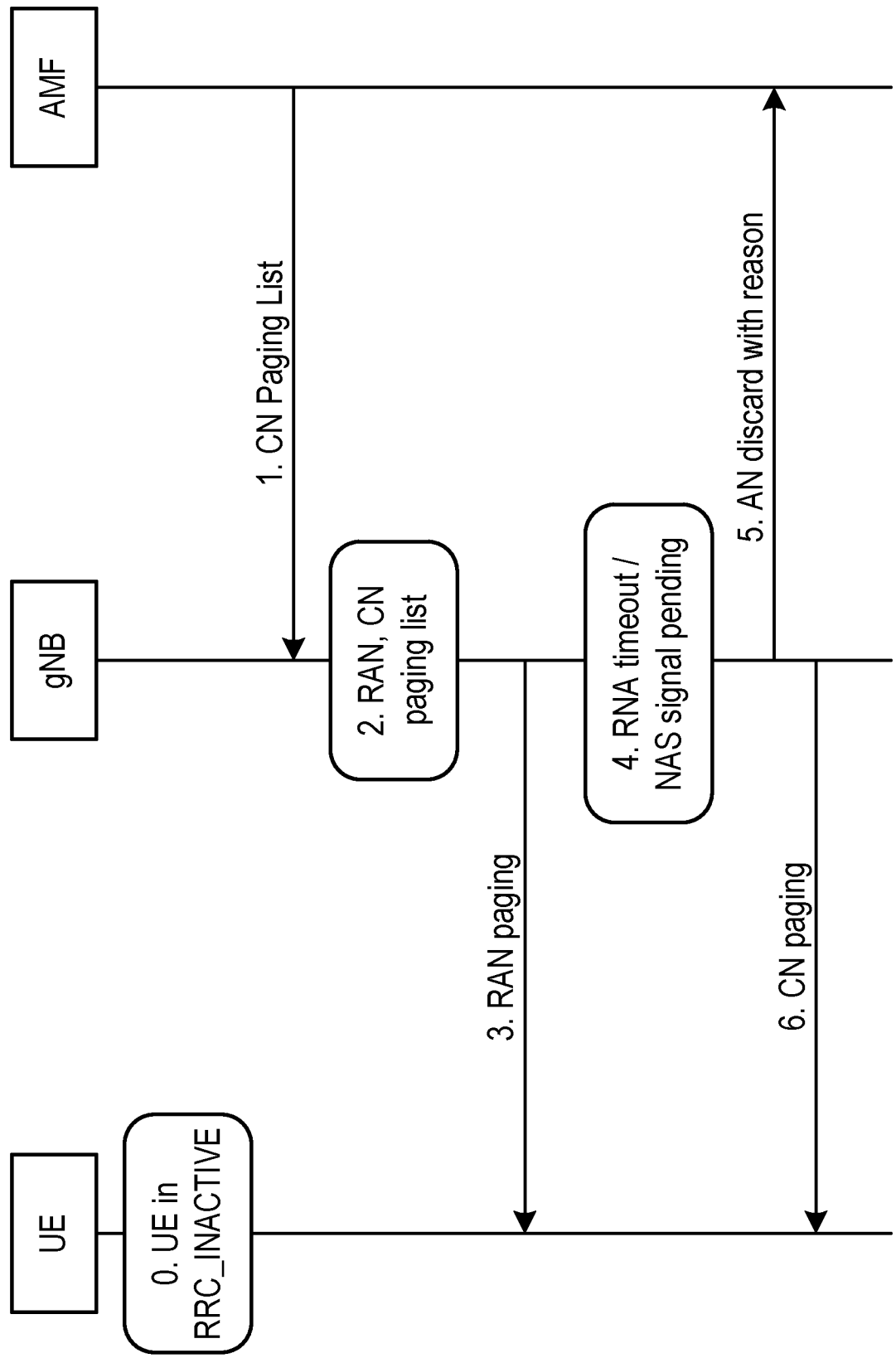
FIG. 10 is a diagram showing a signaling message flow of Alternative RAN-PTW configuration option.

As illustrated by the message flow in FIG. 10, upon reception of a CN paging List from AMF, a designated RAN may list the paging cycle and map the RAN and CN paging ID. The RAN may then transmit the RAN paging in first POs in RAN-PTW. Then, the device can go to light sleep for a period of TRS validity. Then the devices that has RNA timeout and other potential state mismatches included and transmitted via CN paging. Upon A S1 signaling failure or state mismatch or RNA timeout, RAN notifies AMF by triggering "AN disconnect with reason". The benefit of this paging option is that the devices can address a potential mismatch within the awake time without waiting for the next CN-PTW.

In order to calculate the length of the J-PTW the following formula may be used:

JPTW_start, denotes the first radio frame of the PH that is part of the J-PTW and has SFN satisfying the following equation:

$SFN=256 *i_{eDRX}$, where $I_{eDRX}=floor(UE\_ID\_H/T_{eDRX,H})$ mod 4

JPTW_end is the last radio frame of the Joint PTW and has SFN satisfying the following equation:

$SFN=(PTW\_start+(L\_RAN+L\_CN)*100-1)$mod 1024, where

L_CN=Paging Time Window length (in seconds) configured by upper layers

L_RAN=Paging Time Window length (in seconds) configured by RAN

Where,

RANPTW_start, denotes the first radio frame of the PH that is part of the R-PTW and has SFN satisfying the following equation:

$SFN_{RANPTW}=256*i_{eDRX}$, where $I_{eDRX}=floor(UE\_ID\_H/T_{eDRX,H})$ mod 4

RANPTW_end is the last radio frame of the RAN PTW and has SFN satisfying the following equation:

$SFN_{RANPTW}=(PTW\_start+(L\_RAN)*100-1)$mod 1024, where

CNPTW_start, denotes the first radio frame of the PH that is part of the CN-PTW and has SFN satisfying the following equation:

$SFN_{CNPTW}=256*i_{eDRX}$, where $I_{eDRX}=floor(UE\_ID\_H/T_{eDRX,H})$ mod 4

CNPTW_end is the last radio frame of the CN PTW and has SFN satisfying the following equation:

$SFN_{RANPTW}=((RANPTW\_end+light\ sleep\ length+1)+(L\_CN)*100-1)$mod 1024, where Light sleep length, denotes the number of seconds after the RAN PTW_end a device is in light sleep mode.

Intermediary Paging

Due to the concentration of the CN and RAN paging with a paging monitoring occasion i.e. PTW, DL data buffering at the RAN may significantly affect the RAN performance. To avoid such cases an interim RAN paging with—mini PTW (m-PTW) can be configured to page. An example of a m-PTW within two PTW is shown in FIG. 11.

Figure 11:
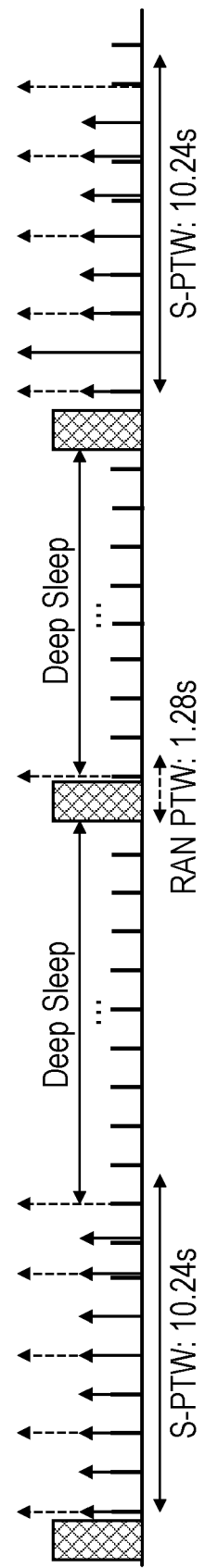
FIG. 11 is a diagram showing a m-PTW within two PTW.

The RAN PTW (m-PTW) in FIG. 11 may contain only one paging occasion, that is, a window is not used but only one paging occasion is configured.

The RAN PTW (m-PTW) in FIG. 11 may be as long as the S-PTW window. In that case, from UE perspective the procedure during the different PTWs can be the same, that is, UE monitors for both paging types (identities).

The UE may follow just one eDRX cycle which the (different) PTWs would follow, for example so that RAN PTW is more frequent compared to S-PTW but the overall combined PTW periodicity is always the same.

Adapted CN Paging

If CN eDRX is either not configured or it is configured to a restrictively short cycle length, a new CN eDRX configuration may be introduced and applied in the case of suspected state mismatch. That is, a second CN eDRX configuration with considerably longer eDRX cycle may be configured as a precaution to be able to reach UEs in case of mismatch (either UE specific or common). If the network believes the UE to be in Idle but cannot reach it, it could try the hypothesis that there is a state mismatch and that the UE is in fact in INACTIVE state. The AMF could then attempt to reach the UE using this second and sparser CN eDRX. The benefit is that the UE would achieve lower energy consumption and longer battery life in INACTIVE state which is not restricted by the CN configuration (since the UE only monitors this new second CN eDRX configuration).

The RAN eDRX configuration, or relevant parts of it, may be signaled to AMF (e.g. over NG-u) and the second CN eDRX configuration above may be configured based on the RAN eDRX configuration.

RAN-CN Signaling Aspects

The RAN eDRX configuration may be adapted to the configured CN eDRX configuration; signaling may be introduced in order to allow adaptation. That is, either new messages may be introduced for this purpose over NG-C interface between gNB and AMF, or existing NG-c messages may be extended to contain the information. One example is given below where the eDRX information is added to the 'INITIAL CONTEXT SETUP REQUEST' message (As disclosed in TS 38.413, available at https://portal.3gpp.org/desktopmodules/Specifications/SpecificationDetails.aspx?specificationId=3223 as of 22 Oct. 2020). In the example below, the addition is the final row "UE eDRX configuration":

9.2.2.1 Initial Context Setup Request

This message is sent by the AMF to request the setup of a UE context.

Direction: AMF→NG-RAN node

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| . | | | | | | |
| . | | | | | | |
| . | | | | | | |
| <Skipped rows> | | | | | | |
| . | | | | | | |
| . | | | | | | |
| . | | | | | | |

-continued

| IE/Group Name | Presence | Range | IE type and reference | Semantics description | Criticality | Assigned Criticality |
|---|---|---|---|---|---|---|
| RG Level Wireline Access Characteristics | O | | OCTET STRING | Specified in TS 23.316 [34]. Indicates the wireline access technology specific QoS information corresponding to a specific wireline access subscription. | YES | ignore |
| Management Based MDT PLMN List 9.3.1.168 | O | | MDT PLMN List | | YES | ignore |
| UE Radio Capability ID | O | | 9.3.1.142 | | YES | reject |
| UE eDRX configuration | O | | TBD | | | |

The ON eDRX configuration may be adapted to the RAN eDRX configuration. One example is given below where the eDRX information is added to the 'INITIAL CONTEXT SETUP RESPONSE' message (Also disclosed in TS 38.413. In the example below, the addition is the final row "UE eDRX configuration":

Initial Context Setup Response

This message is sent by the NG-RAN node to confirm the setup of a UE context.

Direction: NG-RAN node→AMF

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| RAN UE NGAP ID | M | | 9.3.3.2 | | YES | ignore |
| PDU Session Resource Setup Response List | | 0 . . . 1 | | | YES | ignore |
| >PDU Session Resource Setup Response Item | | 1 . . . <maxnoofPDUSessions> | | | — | |
| >>PDU Session ID | M | | 9.3.1.50 | | — | |
| >>PDU Session Resource Setup Response Transfer | M | | OCTET STRING | Containing the PDU Session Resource Setup Response Transfer IE specified in subclause 9.3.4.2. | — | |
| PDU Session Resource Failed to Setup List | | 0 . . . 1 | | | YES | ignore |
| >PDU Session Resource Failed to Setup Item | | 1 . . . <maxnoofPDUSessions> | | | — | |

-continued

| IE/Group Name | Presence | Range | IE type and reference | Semantics description | Criticality | Assigned Criticality |
|---|---|---|---|---|---|---|
| >>PDU Session ID | M | | 9.3.1.50 | | — | |
| >>PDU Session Resource Setup Unsuccessful Transfer | M | | OCTET STRING | Containing the PDU Session Resource Setup Unsuccessful Transfer IE specified in subclause 9.3.4.16. | — | |
| Criticality Diagnostics | O | | 9.3.1.3 | | YES | ignore |
| UE eDRX configuration | O | | TBD | | | |

Figure 12:
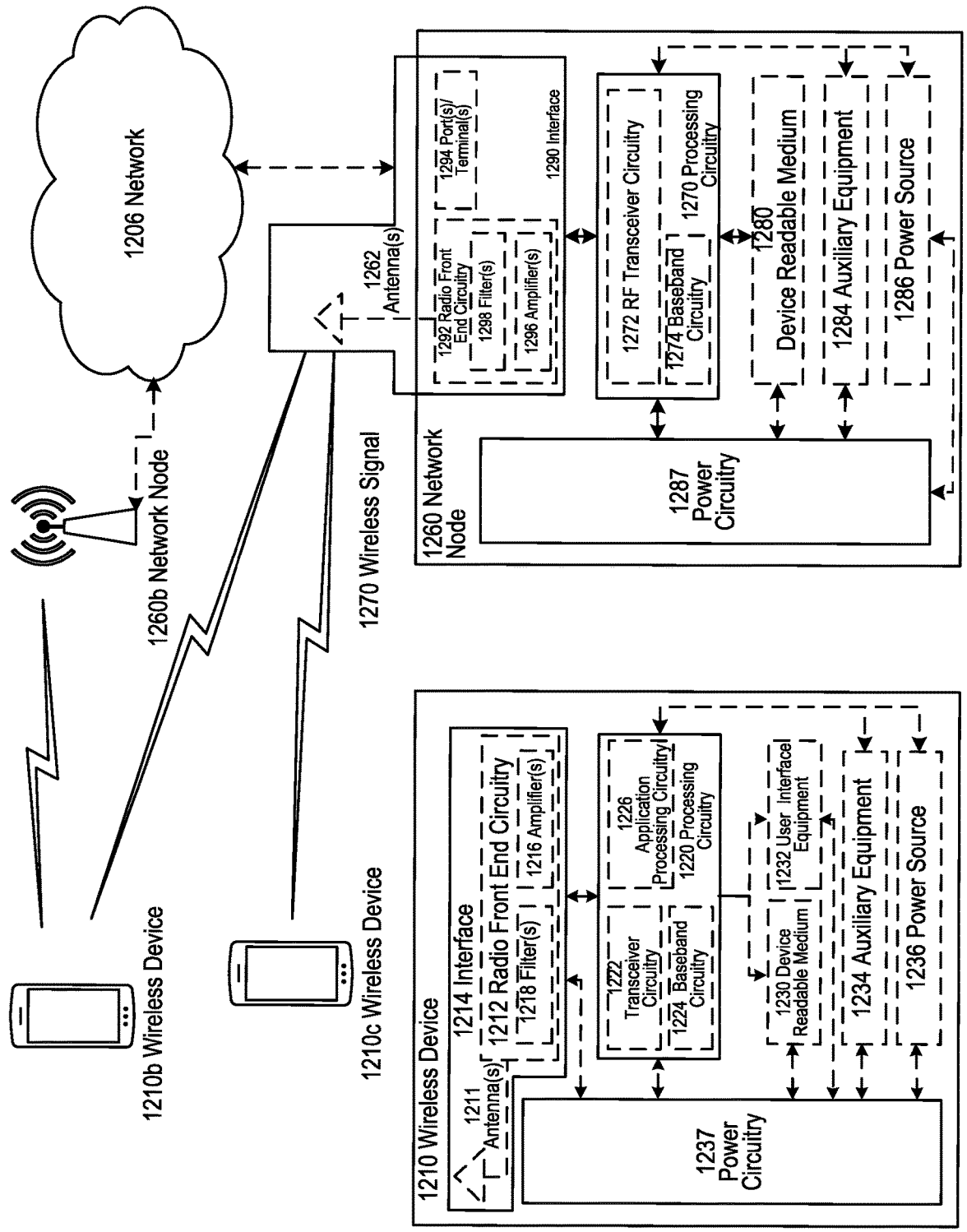
FIG. 12 is a schematic diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
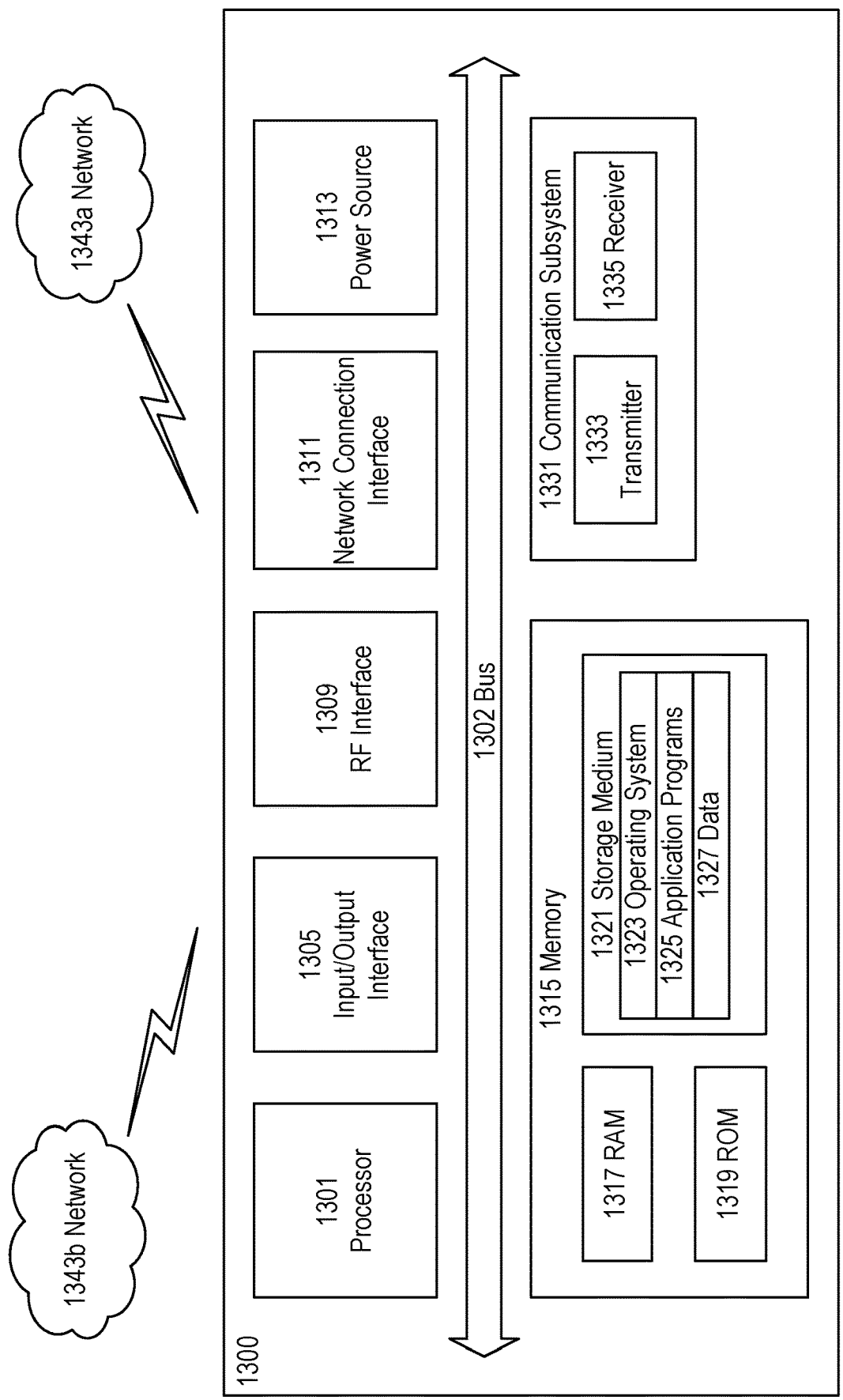
FIG. 13 is a schematic diagram of a user equipment in accordance with some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1300 may be any UE identified by the $3^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343a. Network 1343a may encompass wired and/or wireless networks such as a local-area network (LAN), a wide-area network (WAN), a computer network, a wireless network, a telecommunications network, another like network or any combination thereof. For example, network 1343a may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343b using communication subsystem 1331. Network 1343a and network 1343b may be the same network or networks or different network or networks. Communication subsystem 1331 may be configured to include one or more transceivers used to communicate with network 1343b. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343b may encompass wired and/or wireless networks such as a local-area network (LAN), a wide-area network (WAN), a computer network, a wireless network, a telecommunications network, another like network or any combination thereof. For example, network 1343b may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
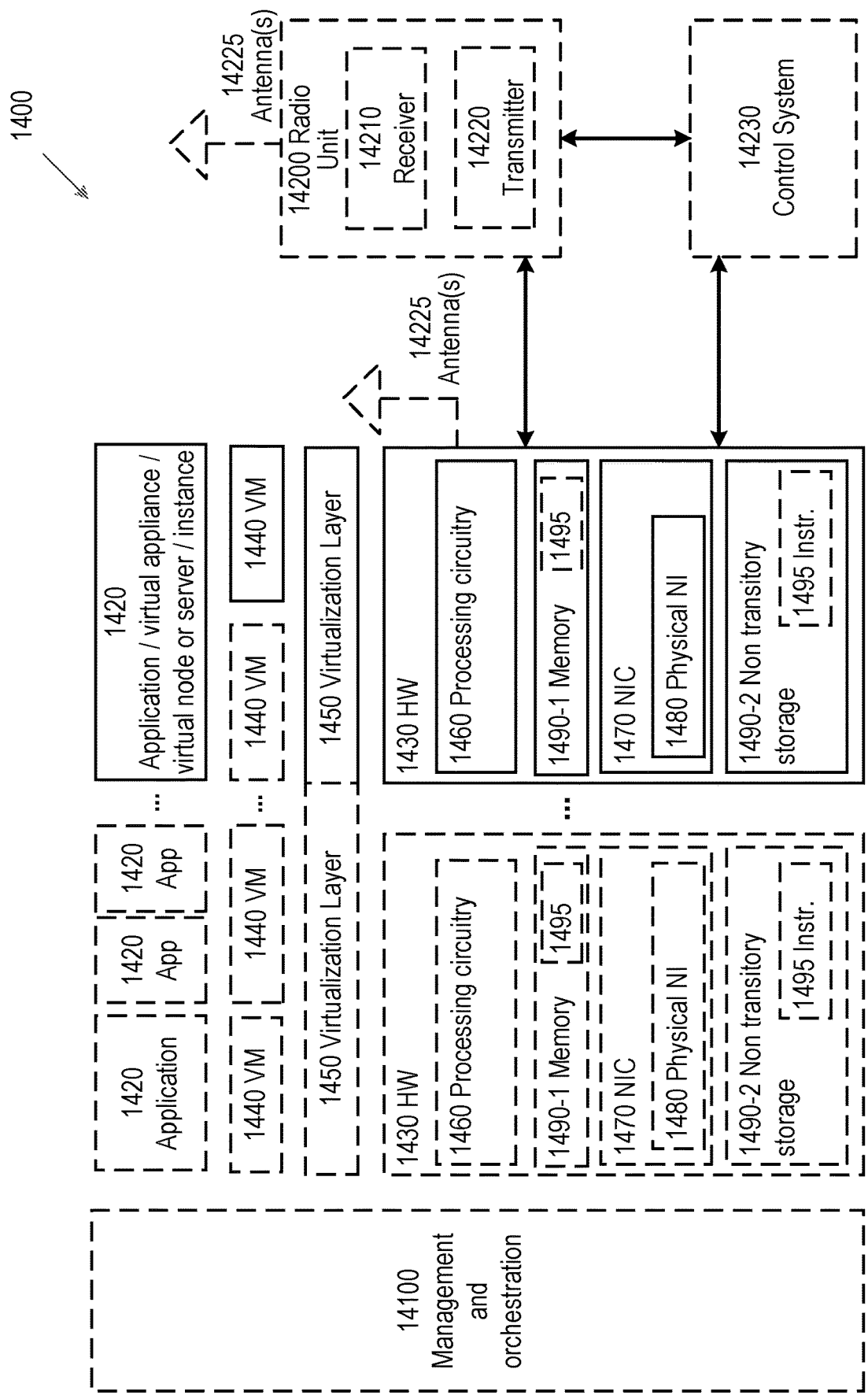
FIG. 14 is a schematic diagram of a virtualization environment in accordance with some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
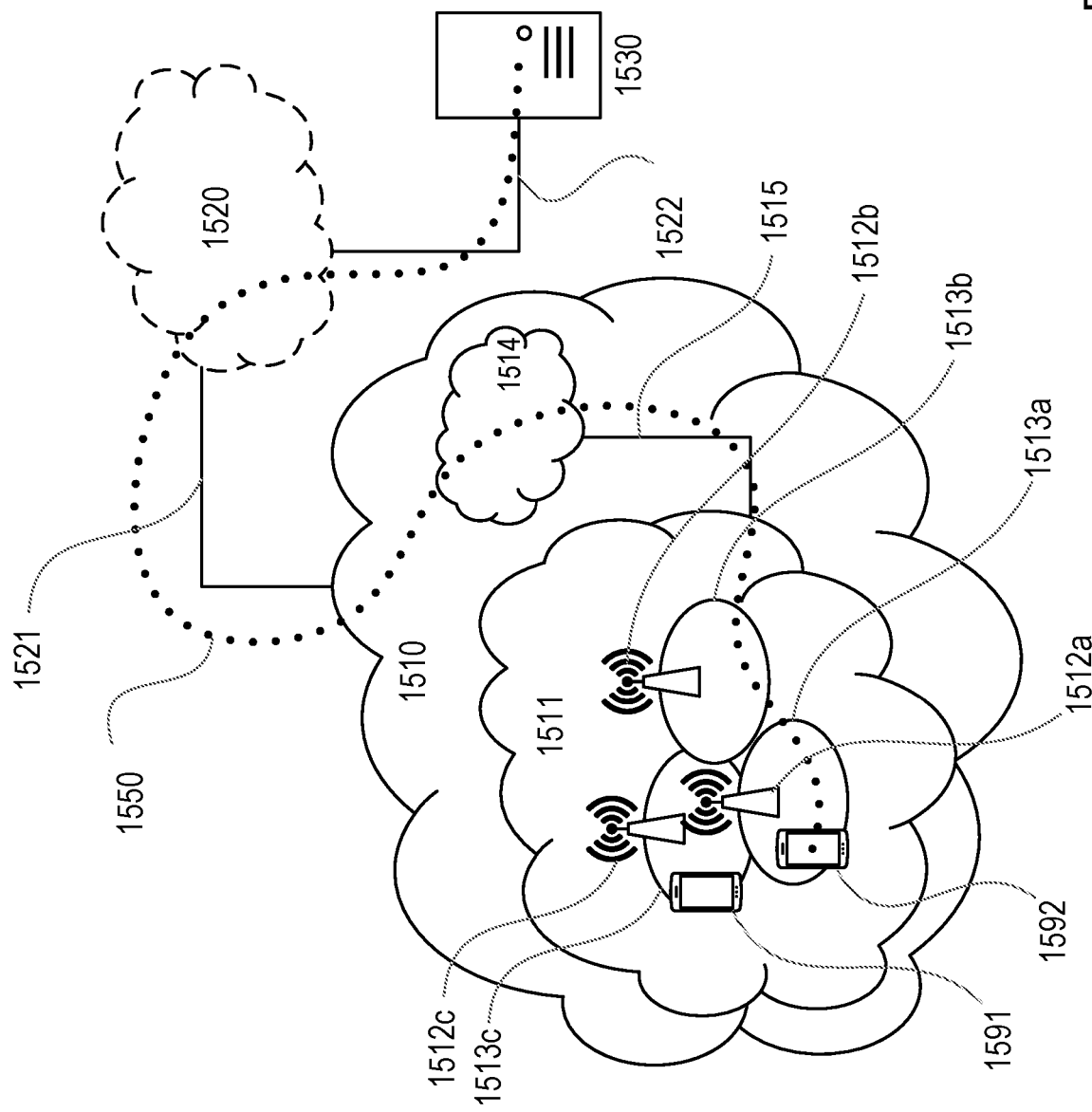
FIG. 15 is a schematic diagram of a telecommunication network connected via an intermediate network to a host computer in accordance with some embodiments.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

Figure 16:
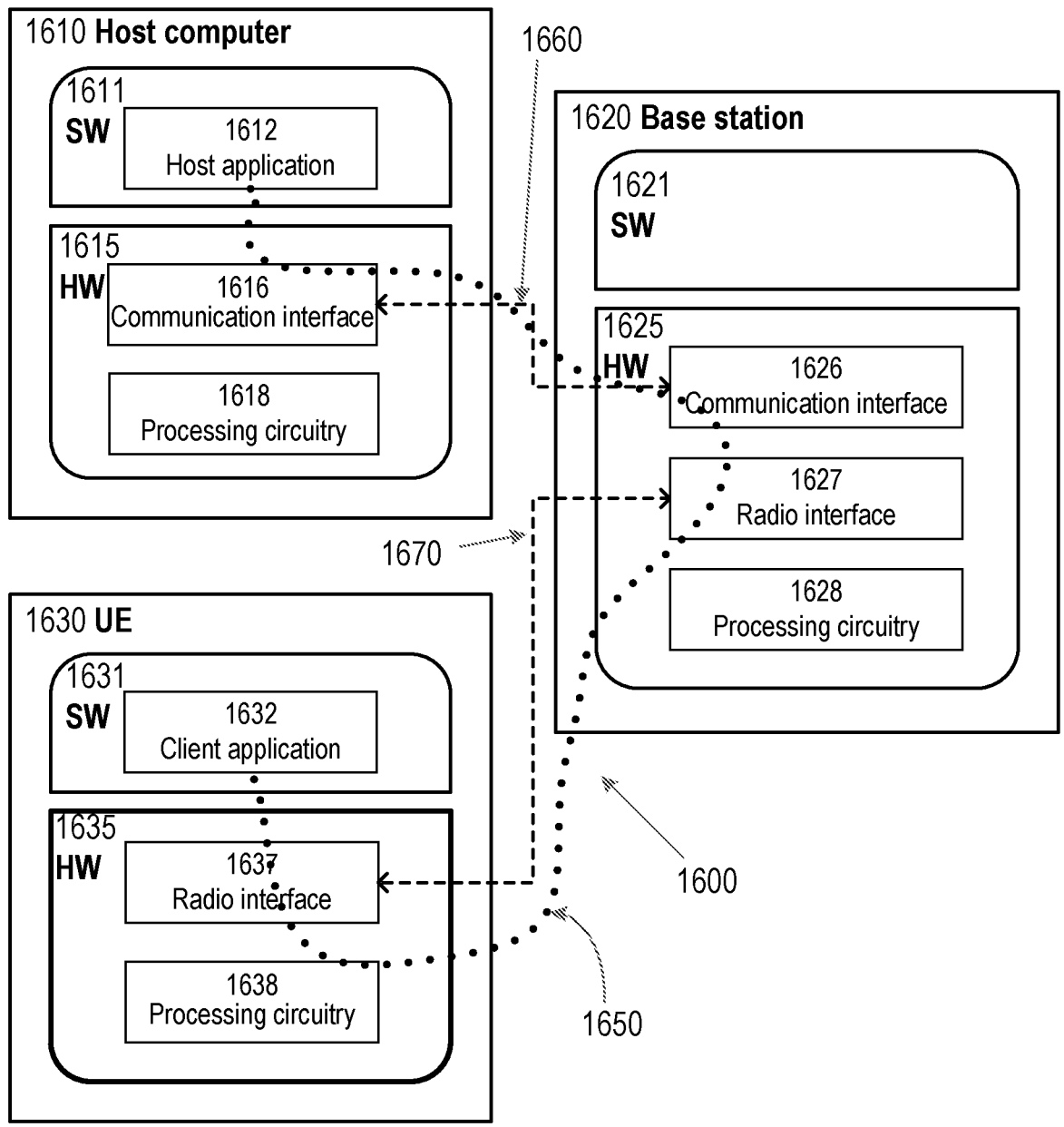
FIG. 16 is a schematic diagram of a host computer communicating via a base station with a user equipment over a partially wireless connection in accordance with some embodiments.

It is noted that host computer 1610, base station 1620 and UE 1630 illustrated in FIG. 16 may be similar or identical to host computer 1530, one of base stations 1512a, 1512b, 1512c and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may improve the power consumption of the UE, and thereby provide benefits such as extended battery lifetime].

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
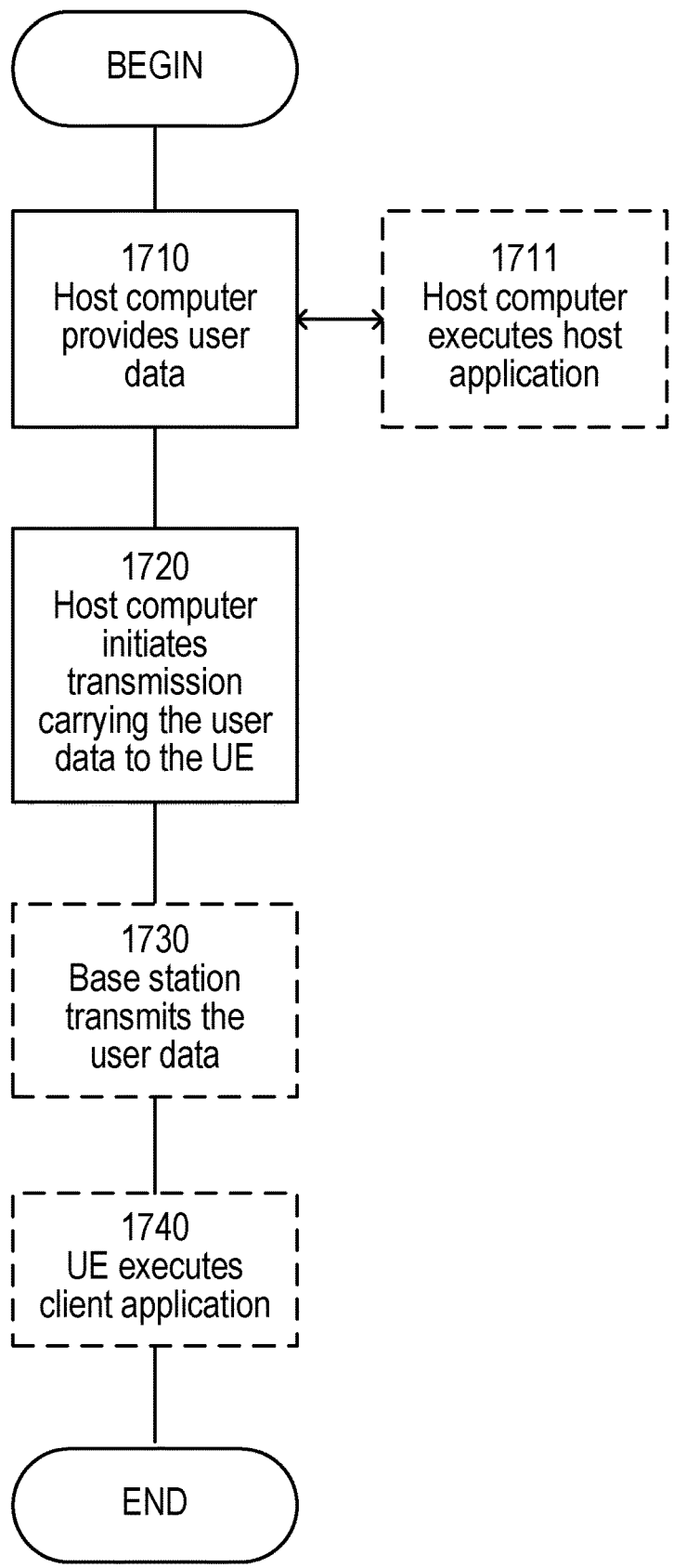
FIG. 17 is a flowchart showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
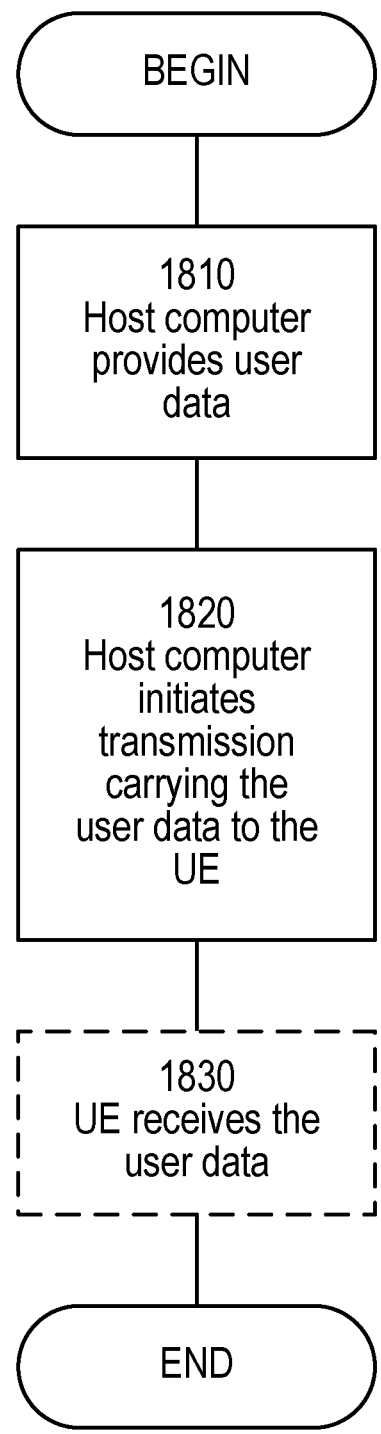
FIG. 18 is a flowchart showing methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
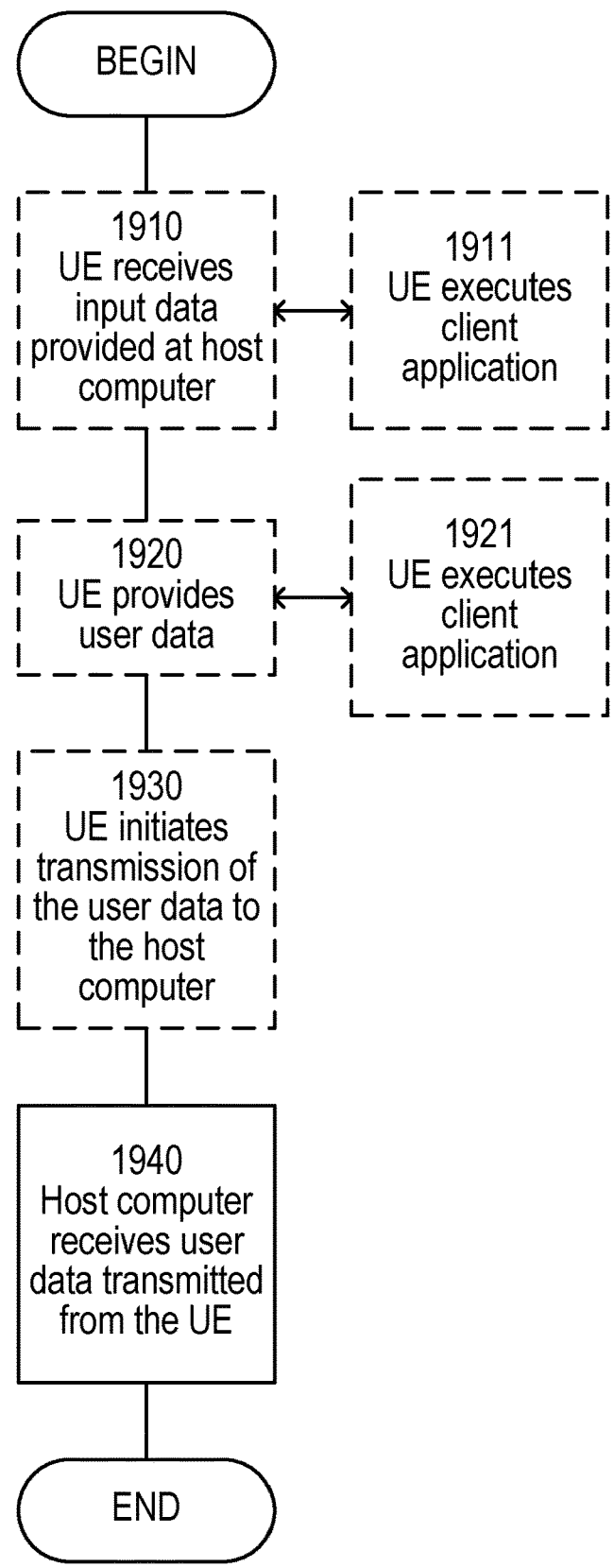
FIG. 19 is a flowchart showing methods implemented in a communication system including a host computer, a base station and a user equipment in accordance with some embodiments.
Figure 20:
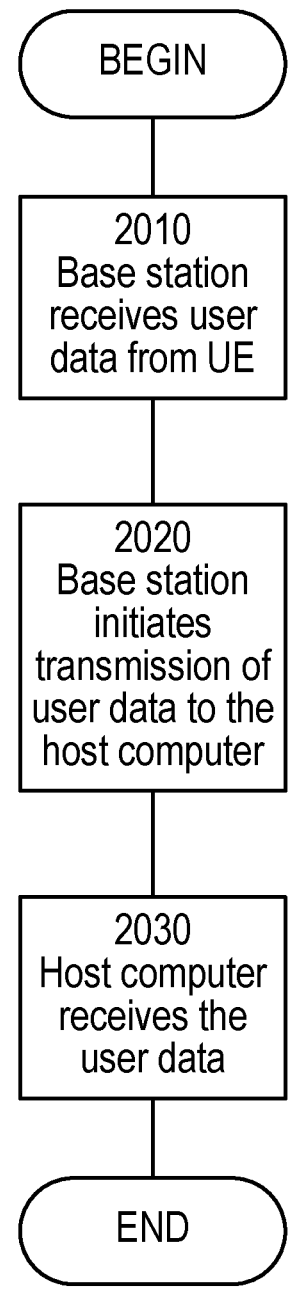
FIG. 20 is a flowchart showing methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Figure 21:
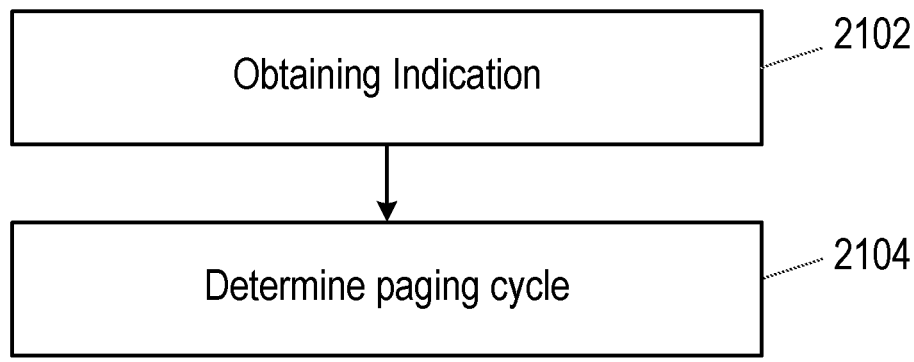
FIG. 21 is a flowchart showing methods in accordance with some embodiments

FIG. 21 depicts a method performed by a wireless device for receiving transmissions in accordance with particular embodiments, for example, the wireless device 1210 as shown in FIG. 12. The method begins at step 2102 with obtaining an indication. The indication may be obtained from a base station, for example, the base station referred to in FIG. 22 or network node 1260 as shown in FIG. 12. The method may further comprise, at step 2104, determining a paging cycle. The paging cycle may be for listening to a downlink channel for transmission from a base station or core network, CN, wherein the base station may be part of a RAN and may be responsible for providing the indication. The paging cycle may be determined based on the obtained indication.

Figure 22:
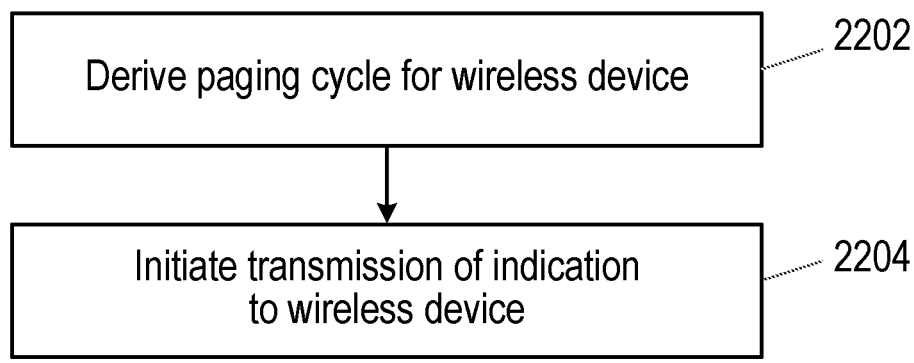
FIG. 22 is a flowchart showing methods in accordance with some embodiments

FIG. 22 depicts a method performed by a base station, for example network node 1260 as shown in FIG. 12, for controlling the reception of transmissions at a wireless device (such as wireless device 1210 as shown in FIG. 12) in accordance with particular embodiments. The method begins at step 2202 with the base station deriving a paging cycle for the wireless device, wherein the paging cycle controls the listening of the wireless device to a downlink channel for transmission from the base station or a core network, CN. The derivation may be performed in conjunction with a CN, and/or using information provided by a CN. The paging cycle may be coordinated with the CN. The method may further comprise, at step 2204, initiating transmission of an indication relating to the paging cycle to the wireless device. The wireless device may be the wireless device of FIG. 21, or a further wireless device.

Figure 23:
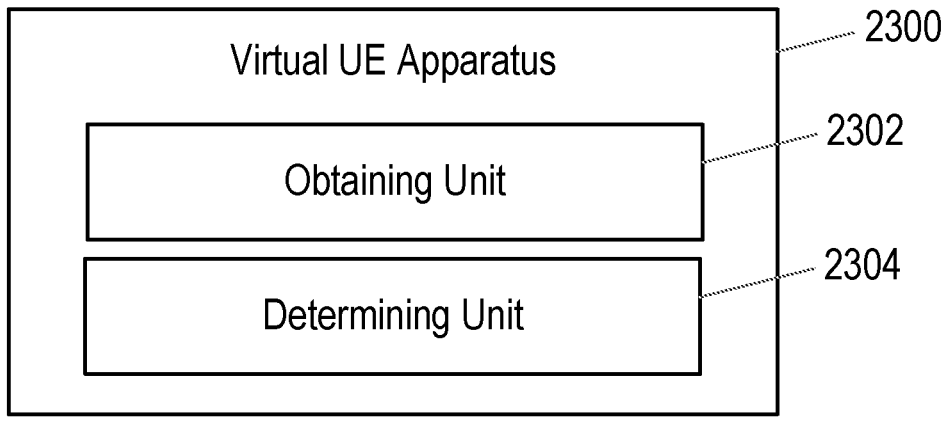
FIG. 23 is a schematic diagram of a virtualization apparatus in accordance with some embodiments.

As illustrated in FIG. 23, virtual UE apparatus 2300 includes obtaining unit 2302 and determining unit 2304.

FIG. 23 illustrates a schematic block diagram of a virtual UE apparatus 2300 in a wireless network (for example, the wireless network shown in FIG. 12). The apparatus may be implemented in one or more wireless devices (e.g. forming part of the network 1206 shown in FIG. 12). Apparatus 2300 is operable to carry out the example method described with reference to FIG. 21 and possibly any other processes or methods disclosed herein. It is also to be understood that the method of FIG. 21 is not necessarily carried out solely by apparatus 2300. At least some operations of the method can be performed by one or more other entities. As illustrated in FIG. 23, virtual UE apparatus 2300 includes obtaining unit 2302 and determining unit 2304.

Virtual Apparatus 2300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 2302 to obtain an indication and determining unit 2304 to determine a paging cycle, and any other suitable units of apparatus 2300 to perform corresponding functions according one or more embodiments of the present disclosure.

Figure 24:
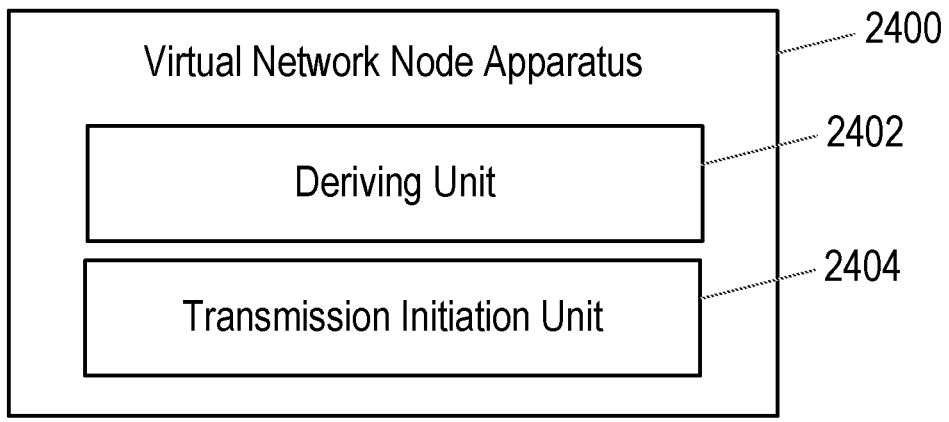
FIG. 24 is a schematic diagram of a virtualization apparatus in accordance with some embodiments.

As illustrated in FIG. 24, virtual network node apparatus 2400 includes deriving unit 2402 and transmission initiation unit 2404.

FIG. 24 illustrates a schematic block diagram of a virtual network node apparatus 2400 in a wireless network (for example, network node 1260 in the wireless network shown in FIG. 12 The apparatus may be implemented in one or more network nodes (e.g. forming part of the network 1206 shown in FIG. 12). Apparatus 2400 is operable to carry out the example method described with reference to FIG. 22 and possibly any other processes or methods disclosed herein. It is also to be understood that the method of FIG. 22 is not necessarily carried out solely by apparatus 2400. At least some operations of the method can be performed by one or more other entities. As illustrated in FIG. 24, virtual network node apparatus 2400 includes deriving unit 2402 and transmission initiation unit 2404.

Virtual network node apparatus 2400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the deriving unit 2402 to derive a paging cycle for the wireless device, wherein the paging cycle controls the listening of the wireless device to a downlink channel for transmissions from a RAN (potentially from the virtual network node) or a CN, and/or to cause the transmission initiation unit 2404 to cause an indication relating to the paging cycle to be transmitted.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following numbered embodiments provide additional information on the disclosure.

1. A method performed by a wireless device for receiving transmissions, the method comprising:
   obtaining an indication; and
   determining a paging cycle for listening to a downlink channel for transmissions from a base station or core network, CN, based on the obtained indication.
2. The method of embodiment 1, wherein the wireless device listens in accordance with the determined paging cycle while in while in a Radio Resource Control, RRC, inactive state, or while in a RRC idle state.
3. The method of any of embodiments 1 and 2, wherein the indication is received from the base station.
4. The method of embodiment 3, wherein the indication includes information on a paging cycle followed by the base station, and wherein the wireless device determines to use the paging cycle followed by the base station and/or a further paging cycle used by the CN based on the information.
5. The method of any of embodiments 3 or 4, wherein the wireless device determines, based on the indication, to set separate paging window lengths for the base station and CN or to use the same paging window length for the base station and CN.
6. The method of any preceding embodiment wherein the wireless device determines to use a default paging cycle for the base station and CN unless instructed otherwise in the indication.
7. The method of any preceding embodiment, wherein the wireless device is a New Radio, NR, RedCap User Equipment, UE, and/or wherein the wireless device supports extended discontinuous reception, eDRX.
8. The method of any of the previous embodiments, further comprising:
   providing user data; and
   forwarding the user data to a host computer via the transmission to the base station.
9. A method performed by a base station for controlling the reception of transmissions at a wireless device, the method comprising:
   deriving a paging cycle for the wireless device, wherein the paging cycle controls the listening of the wireless device to a downlink channel for transmission from the base station or a core network, CN; and
   initiating transmission of an indication relating to the paging cycle to the wireless device.
10. The method of embodiment 9 wherein, prior to initiating transmission of the indication to the wireless device, the base station coordinates the paging cycle with the CN.
11. The method of embodiment 10, wherein the base station receives, from the CN, information relating to an extended discontinuous reception, eDRX, cycle length and/or a paging window length.

12. The method of embodiment 11, wherein an Access and Mobility Management Function, AMF, of the CN configures a paging window length for the base station, and wherein the base station receives the same from the AMF.

13. The method of embodiment 12, wherein the AMF indicates a RAN-paging cycle length, CN paging cycle length and paging window length in an assistance message to the base station, for use by the base station in deriving the paging cycle.

14. The method of embodiment 12, wherein the AMF includes a paging discontinuous reception IE in the information sent to the base station.

15. The method of any of embodiments 9 to 14, wherein the CN indicates to the base station a RAN paging window length and a CN paging window length, and wherein the RAN paging window length and CN paging window length are the same length or different lengths.

16. The method of any of embodiments 9 to 15, wherein the indication relating to the paging cycle indicates whether the base station and CN will use the same paging cycle.

17. The method of embodiment 9, wherein the wireless device uses a default paging cycle, and wherein the indication relating to the paging cycle includes paging window lengths.

18. The method of any of embodiments 9 to 16, wherein:
the base station and CN transmit paging using a shared paging window, S-PTW;
the base station and CN use different paging cycles with different paging windows; and/or
the base station and CN use the same paging cycle with different paging windows, J-PTW.

19. The method of embodiment 18, wherein the base station and CN transmit paging using S-PTW, and wherein the base station schedules base station and CN paging occasions randomly or based on a scheduling mechanism.

20. The method of embodiment 18, wherein the base station and CN transmit paging using S-PTW, and wherein the base station and CN use the same paging occasions.

21. The method of embodiment 18, wherein the base station and CN use the same paging cycle with different paging windows, J-PTW, and wherein the base station paging is scheduled to avoid synchronisation with the CN paging.

22. The method of embodiment 18, wherein the base station and CN use S-PTW, and wherein the base station further uses interim paging with a mini paging window, m-PTW.

23. The method of any of embodiments 9 to 22, wherein the CN applies a secondary extended discontinuous reception, eDRX, configuration in cases where a state mismatch of the wireless device is suspected.

24. The method of any of embodiments 9 to 23, further comprising:
obtaining user data; and
forwarding the user data to a host computer or a wireless device.

25. A wireless device for receiving transmissions, the wireless device comprising:
processing circuitry configured to perform any of the steps of any of embodiments 1 to 8; and power supply circuitry configured to supply power to the wireless device.

26. A base station for controlling the reception of transmissions at a wireless device, the base station comprising:
processing circuitry configured to perform any of the steps of any of embodiments 9 to 24;
power supply circuitry configured to supply power to the base station.

27. A user equipment (UE) for receiving transmissions, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of embodiments 1 to 8;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

28. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of embodiments 9 to 24.

29. The communication system of embodiment 28 further including the base station.

30. The communication system of any of embodiments 28 and 29, further including the UE, wherein the UE is configured to communicate with the base station.

31. The communication system of any of embodiments 28 to 30, wherein:
the processing circuitry of the host computer is configured to execute a host application, thereby providing the user data; and
the UE comprises processing circuitry configured to execute a client application associated with the host application.

32. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of embodiments 9 to 24.

33. The method of embodiment 32, further comprising, at the base station, transmitting the user data.

34. The method of any of embodiments 32 and 33, wherein the user data is provided at the host computer by executing a host application, the method further comprising, at the UE, executing a client application associated with the host application.

35. A user equipment (UE) configured to communicate with a base station, the UE comprising a radio interface and processing circuitry configured to performs a method in accordance with any of embodiments 1 to 8.

36. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of embodiments 1 to 8.

37. The communication system of embodiment 36, wherein the cellular network further includes a base station configured to communicate with the UE.

38. The communication system of any of the 36 and 37 embodiments, wherein:
the processing circuitry of the host computer is configured to execute a host application, thereby providing the user data; and
the UE's processing circuitry is configured to execute a client application associated with the host application.

39. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of embodiments 1 to 8.

40. The method of embodiment 39, further comprising at the UE, receiving the user data from the base station.

41. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of embodiments 1 to 8.

42. The communication system of embodiment 41, further including the UE.

43. The communication system of any of embodiments 41 and 42, further including the base station, wherein the base station comprises a radio interface configured to communicate with the UE and a communication interface configured to forward to the host computer the user data carried by a transmission from the UE to the base station.

44. The communication system of any of embodiments 41 to 43, wherein:
the processing circuitry of the host computer is configured to execute a host application; and
the UE's processing circuitry is configured to execute a client application associated with the host application, thereby providing the user data.

45. The communication system of any of embodiments 41 to 44, wherein:
the processing circuitry of the host computer is configured to execute a host application, thereby providing request data; and
the UE's processing circuitry is configured to execute a client application associated with the host application, thereby providing the user data in response to the request data.

46. A method implemented in a communication system including a host computer, a base station and a user equipment (UE), the method comprising:
at the host computer, receiving user data transmitted to the base station from the UE, wherein the UE performs any of the steps of any of embodiments 1 to 8.

47. The method of embodiment 46, further comprising, at the UE, providing the user data to the base station.

48. The method of any of embodiments 46 and 47, further comprising:
at the UE, executing a client application, thereby providing the user data to be transmitted; and
at the host computer, executing a host application associated with the client application.

49. The method of any of embodiments 46 to 48, further comprising:
at the UE, executing a client application; and
at the UE, receiving input data to the client application, the input data being provided at the host computer by executing a host application associated with the client application,
wherein the user data to be transmitted is provided by the client application in response to the input data.

50. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of embodiments 9 to 24.

51. The communication system of embodiment 50 further including the base station.

52. The communication system of any of embodiments 50 and 51, further including the UE, wherein the UE is configured to communicate with the base station.

53. The communication system of any of embodiments 50 to 52, wherein:
the processing circuitry of the host computer is configured to execute a host application;
the UE is configured to execute a client application associated with the host application, thereby providing the user data to be received by the host computer.

54. A method implemented in a communication system including a host computer, a base station and a user equipment (UE), the method comprising:
at the host computer, receiving, from the base station, user data originating from a transmission which the base station has received from the UE, wherein the UE performs any of the steps of any of embodiments 1 to 8.

55. The method of embodiment 54, further comprising at the base station, receiving the user data from the UE.

56. The method of any of embodiments 54 and 55, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

S-PTW Shared Paging Time Window
J-PTW Joint Paging Time Window
m-PTW Mini Paging Time Window
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for receiving transmissions, the method comprising:
   obtaining an indication; and
   determining a paging cycle for listening to a downlink channel for transmissions from a base station or core network (CN) based on the obtained indication, wherein the base station and CN transmit paging using a shared paging window (S-PTW).

2. The method of claim 1, further comprising listening to the downlink channel in accordance with the determined paging cycle while in a Radio Resource Control (RRC) inactive state or while in an RRC idle state.

3. The method of claim 1, wherein obtaining the indication comprises receiving the indication from the base station.

4. The method of claim 3, wherein the indication includes information on a paging cycle followed by the base station, and wherein the method further comprises determining to use the paging cycle followed by the base station and/or a further paging cycle used by the CN based on the information.

5. The method of claim 3, further comprising determining, based on the indication, to set separate paging window lengths for the base station and CN or to use the same paging window length for the base station and CN.

6. The method of claim 1, further comprising determining to use a default paging cycle for the base station and CN unless instructed otherwise in the indication.

7. The method of claim 1, wherein the wireless device is a New Radio (NR) RedCap User Equipment (UE) and/or wherein the wireless device supports extended discontinuous reception (eDRX).

8. A method performed by a base station for controlling reception of transmissions at a wireless device, the method comprising:
   deriving a paging cycle for the wireless device, wherein the paging cycle controls the listening of the wireless device to a downlink channel for transmission from the base station or a core network (CN), wherein the base station and CN transmit paging using a shared paging window (S-PTW); and
   initiating transmission of an indication relating to the paging cycle to the wireless device.

9. The method of claim 8, further comprising, prior to initiating transmission of the indication to the wireless device, coordinating the paging cycle with the CN.

10. The method of claim 9, further comprising receiving, from the CN, information relating to an extended discontinuous reception (eDRX) cycle length and/or a paging window length.

11. The method of claim 10, wherein an Access and Mobility Management Function (AMF) of the CN configures a paging window length for the base station, and wherein the method further comprises receiving, by the base station, the paging window length from the AMF.

12. The method of claim 11, further comprising receiving, by the base station, an assistance message from the AMF indicating a Radio Access Network (RAN) paging cycle length, CN paging cycle length, and paging window length, and using the paging cycle length, the CN paging cycle length, and the paging window length to derive the paging cycle.

13. The method of claim 11, wherein a paging discontinuous reception information element, IE, is included in the received information.

14. The method of claim 8, further comprising receiving, from the CN, an indication of a Radio Access Network (RAN) paging window length and a CN paging window length, wherein the RAN paging window length and CN paging window length are the same length.

15. The method of claim 8, wherein the indication relating to the paging cycle indicates whether the base station and CN will use the same paging cycle.

16. The method of claim 8, wherein the wireless device uses a default paging cycle, and wherein the indication relating to the paging cycle includes paging window lengths.

17. The method of claim 8, wherein the base station and CN use the same paging cycle with different paging windows (J-PTW), and wherein the base station paging is scheduled to avoid synchronisation with the CN paging.

18. A wireless device for receiving transmissions, the wireless device comprising:
   processing circuitry configured to cause the wireless device to obtain an indication and determine a paging cycle for listening to a downlink channel for transmission from a base station or core network (CN) based on the obtained indication, wherein the base station and CN transmit paging using a shared paging window (S-PTW); and
   power supply circuitry configured to supply power to the wireless device.

19. A base station for controlling the reception of transmissions at a wireless device, the base station comprising:
   processing circuitry configured to cause the base station to:
      derive a paging cycle for the wireless device, wherein the paging cycle controls the listening of the wireless device to a downlink channel for transmission from the base station or a core network (CN), wherein the base station and CN transmit paging using a shared paging window (S-PTW); and
      initiate transmission of an indication relating to the paging cycle to the wireless device; and
   power supply circuitry configured to supply power to the base station.

* * * * *